(12) United States Patent
Lin et al.

(10) Patent No.: US 7,982,486 B2
(45) Date of Patent: Jul. 19, 2011

(54) METHOD FOR MEASURING PN-JUNCTION TEMPERATURE OF LIGHT-EMITTING DIODE (LED)

(75) Inventors: Ming-Te Lin, Hsin Chu (TW);
Kuang-Yu Tai, Hsin Chu (TW);
Jyh-Chen Chen, Jhogli (TW);
Farn-Shiun Hwu, Yangmei Township, Taoyuan County (TW)

(73) Assignees: Industrial Technology Research Institute, Hsin Chu (TW); National Central University, Jhongli ( * ) Notice: Subject to any disclaimer, the term of this patent is extended or adjusted under 35 U.S.C. 154(b) by 169 days.

(21) Appl. No.: 12/353,294

(22) Filed: Jan. 14, 2009

(65) Prior Publication Data

US 2010/0004892 A1 Jan. 7, 2010

(30) Foreign Application Priority Data

Jul. 7, 2008 (TW) .............................. 97125659 A
Dec. 2, 2008 (TW) .............................. 97146811 A

(51) Int. Cl.
*G01R 31/26* (2006.01)

(52) U.S. Cl. ............... 324/762.07; 324/750.01; 702/136

(58) Field of Classification Search .................. 374/178; 702/130; 324/762, 762.07
See application file for complete search history.

(56) References Cited

U.S. PATENT DOCUMENTS

| 4,651,292 A * | 3/1987 | Jeenicke et al. ................ 702/86 |
| 5,401,099 A * | 3/1995 | Nishizawa et al. ........... 374/178 |
| 5,926,778 A * | 7/1999 | Poppel .......................... 702/130 |
| 7,052,180 B2 * | 5/2006 | Shih .............................. 374/178 |
| 7,452,128 B2 * | 11/2008 | Franch et al. ................. 374/178 |

* cited by examiner

*Primary Examiner* — Ha Tran T Nguyen
*Assistant Examiner* — Richard Isla Rodas
(74) *Attorney, Agent, or Firm* — Ming Chow; Sinorica, LLC

(57) ABSTRACT

The present invention provides a method for measuring the PN-junction temperature of a light-emitting diode (LED), which uses a reference voltage to establish the function of current, real power, power factor, or driving-time interval on temperature. The initial and thermal-equilibrium values of current, real power, power factor, or driving-time interval are measured, and hence the variations thereof are calculated. Referring to the pre-established function, the temperature change is given. By the temperature change and the initial temperature, the PN-junction temperature of the LED is thereby deduced.

9 Claims, 21 Drawing Sheets

US 7,982,486 B2

METHOD FOR MEASURING PN-JUNCTION TEMPERATURE OF LIGHT-EMITTING DIODE (LED)

FIELD OF THE INVENTION

The present invention relates generally to a method for measuring temperature, and particularly to a method for measuring PN-junction temperature of a light-emitting diode (LED).

BACKGROUND OF THE INVENTION

A light-emitting diode (LED) generates heat while emitting light. Thereby, to know well about temperature is a very critical issue for developing LED-related products. However, there is still no effective method for measuring PN-junction temperature of an LED. Hence, the development of an LED has to measure the operating temperature under every operating condition, delaying the development progress, which is not least welcomed by R&D workers. Accordingly, a novel method for measuring PN-junction temperature of an LED is needed in the field of LED technology for providing accurate measured data, and for being applied extensively to various operating conditions of an LED.

The present invention provides a method for measuring PN-junction temperature of an LED, and the problems described above can thereby be solved.

SUMMARY

An objective of the present invention is to provide a method for measuring PN-junction temperature of an LED, which uses the variations of current due to temperature changes to deduce the PN-junction temperature of the LED.

Another objective of the present invention is to provide a method for measuring PN-junction temperature of an LED, which uses the variations of real power due to temperature changes to deduce the PN-junction temperature of the LED.

Another objective of the present invention is to provide a method for measuring PN-junction temperature of an LED, which uses the variations of power factor due to temperature changes to deduce the PN-junction temperature of the LED.

Still another objective of the present invention is to provide a method for measuring PN-junction temperature of an LED, which uses the variations of driving-time interval due to temperature changes to deduce the PN-junction temperature of the LED.

The present invention relates to a method for measuring PN-junction temperature of an LED comprising the following steps. Firstly, an LED is provided. Then apply a reference voltage to the LED to establish functions of current versus temperature, real power versus temperature, power factor versus temperature, or driving-time interval versus temperature. Next, apply a measuring voltage to the LED to acquire current variation, real power variation, power factor variation, or driving-time variation. Afterwards, perform computations using said measured variations and the corresponding functions to give temperature changes. By knowing the initial temperature, the PN-junction temperature of the LED can be thereby deduced. The measuring method according to the present invention can be applied to measuring LEDs in various operating conditions. In addition, the error of the measurement result according to the present invention is small, and hence can be applied to research and development works.

DETAILED DESCRIPTION

Figure 1:
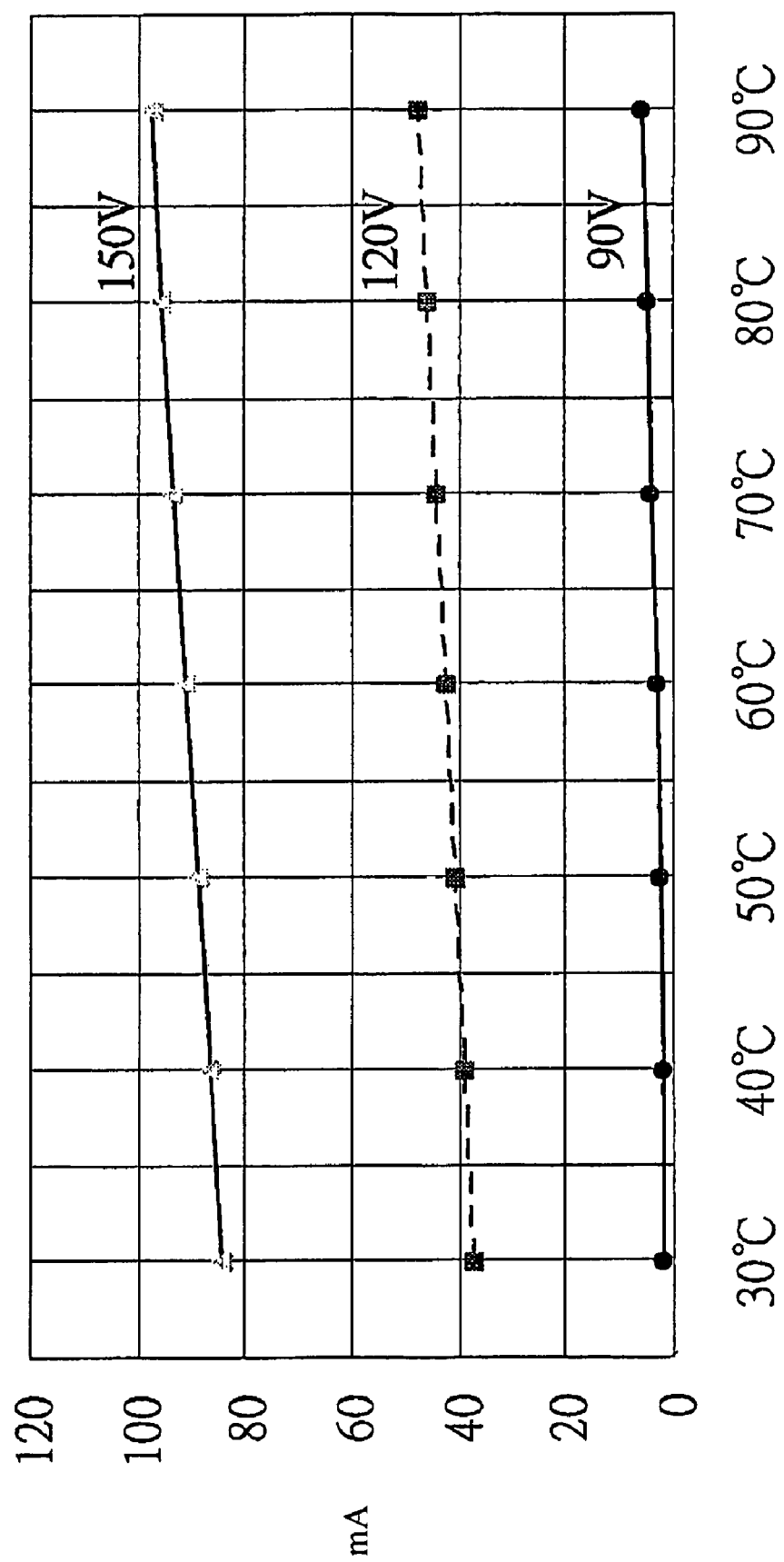
FIG. 1 shows curves according to a preferred embodiment of the present invention.

In order to make the structure and characteristics as well as the effectiveness of the present invention to be further understood and recognized, the detailed description of the present invention is provided as follows along with preferred embodiments and accompanying figures.

As shown in Table 1 as follows, the measurement results of voltage-current-temperature (I-V-T) according to the present invention are shown.

TABLE 1

| Voltage (V) | 30° C. | | 40° C. | | 50° C. | | 60° C. | | 70° C. | | 80° C. | | 90° C. | |
|---|---|---|---|---|---|---|---|---|---|---|---|---|---|---|
| | Forward (mA) | Reverse (mA) | Forward (mA) | Reverse (mA) | Forward (mA) | Reverse (mA) | Forward (mA) | Reverse (mA) | Forward (mA) | Reverse (mA) | Forward (mA) | Reverse (mA) | Forward (mA) | Reverse (mA) |
| 80 | 0 | 0.2 | 0 | 0.2 | 0 | 0.2 | 0 | 0.3 | 0 | 0.3 | 0 | 0.4 | 0 | 0.4 |
| 90 | 1.5 | 2.1 | 2 | 2.7 | 2.5 | 3.4 | 3.1 | 4.1 | 3.8 | 4.9 | 4.7 | 5.5 | 5.5 | 6.3 |
| 100 | 10.6 | 11.3 | 11.6 | 12.5 | 12.8 | 13.6 | 13.9 | 14.7 | 15.1 | 15.9 | 16.3 | 17.2 | 17.5 | 18.3 |
| 110 | 23.3 | 23.8 | 24.6 | 25.3 | 26.1 | 26.6 | 27.5 | 28.1 | 29.1 | 29.6 | 30.5 | 31.1 | 31.9 | 32.4 |
| 120 | 37.2 | 37.4 | 38.8 | 39.3 | 40.6 | 40.8 | 42.4 | 42.6 | 44.1 | 44.4 | 45.8 | 46 | 47.3 | 47.7 |
| 130 | 52 | 52.1 | 53.9 | 54.1 | 55.9 | 56 | 57.9 | 57.9 | 59.6 | 60.1 | 61.7 | 61.8 | 63.5 | 63.5 |
| 150 | 84 | 84.1 | 86.4 | 86.4 | 88.6 | 88.6 | 91 | 91.1 | 93.2 | 93.3 | 95.5 | 95.5 | 97.5 | 97.5 |

An alternating-current (AC) LED is composed of two sets of direct-current (DC) LED chips connected in reverse directions. Thereby, forward or reverse DC biases can be applied to the AC LED, and establish the corresponding I-V-T data. Then, operate the LED at the rated voltage, and measure the current variations in the LED. According to the pre-established I-V-T data, the PN-junction temperature of the LED can be deduced. Besides, an AC voltage can be applied directly as the reference voltage.

Referring to Table 1, at different temperatures, apply DC voltages to the forward direction of the LED (that is, the direction with forward current for the first set of LED chips), and measure the forward current thereof. Next, apply DC voltages to the reverse direction of the LED (that is, the direction with forward current for the second set of LED chips), and measure the reverse current thereof. Then the data in Table 1 is collected. As shown in Table 1, the measurement temperatures are 30° C., 40° C., 50° C., 60° C., 70° C., 80° C., and 90° C., respectively. Because when the applied voltage is 80V, the forward current is zero, and the reverse currents under various measurement temperatures are 0.2 mA, 0.2 mA, 0.2 mA, 0.3 mA, 0.3 mA, 0.4 mA, and 0.4 mA, respectively. Thereby, 80V cannot be used as the driving voltage of the LED. If the qualities of LED chips in a product are even, their forward and reverse currents should be the same. According to Table 1, the forward and reverse currents are not the same, which is caused by uneven qualities of LED chips. Because it is sufficient to acquire measurement results by observing only one set of data, a set of reverse currents is discussed in the present invention.

Referring to the 90V data on the second row of Table 1, there are measurement results when applying a 90V voltage to the LED at various temperatures. The forward currents are 1.5 mA, 2.0 mA, 2.5 mA, 3.1 mA, 3.8 mA, 4.7 mA, and 5.5 mA; and the reverse currents are 2.1 mA, 2.7 mA, 3.4 mA, 4.1 mA, 4.9 mA, 5.5 mA, and 6.3 mA. Thereby, it means that 90V is greater than and close to the starting voltage of the LED. The other measurement results in Table 1 are those for applied voltage of 100V, 110V, 120V, 130V, and 150V, respectively.

In Table 2 shown as follows, measurement results for 90V, 120V, and 150V are sampled for further analysis.

TABLE 2

| | 30° C. | 40° C. | 50° C. | 60° C. | 70° C. | 80° C. | 90° C. |
|---|---|---|---|---|---|---|---|
| 90 V | 1.5 | 2 | 2.5 | 3.1 | 3.8 | 4.7 | 5.5 |
| 120 V | 37.2 | 38.8 | 40.6 | 42.4 | 44.1 | 45.8 | 47.3 |
| 150 V | 84 | 86.4 | 88.6 | 91 | 93.2 | 95.5 | 97.5 |

The measurement results shown in Table 1 are grouped into seven voltages. Because the results of 80V do not exceed the starting voltage of the LED, the whole measurement results of 80V are omitted. The remaining six sets of measurement results exhibit similar linear characteristics. Thereby, for simplicity, three of the six sets, namely, 90V, 120V, and 150V, are sampled for further observing their linear characteristics.

FIG. 1 shows curves according to a preferred embodiment of the present invention. As shown in the figure, the measuring method according to the present invention uses temperature as the X-axis and current as the Y-axis, and plots the measurement results in Table 2 thereon. The curves are measurement results for 150V, 120V, and 90V, respectively, which show linear relationship between current and temperature. The three curves of the measurement results for 150V, 120V, and 90V exhibit approximately linear dependence with minor differences in their slopes. The current (I)-temperature (T) curve of 150V has the largest slope; 120V, the modest; and 90V, the smallest.

In Table 3 as shown below, the measurement results of 90V in Table 2 are extracted.

TABLE 3

| | 30° C. | 40° C. | 50° C. | 60° C. | 70° C. | 80° C. | 90° C. |
|---|---|---|---|---|---|---|---|
| 90 V | 1.5 | 2 | 2.5 | 3.1 | 3.8 | 4.7 | 5.5 |

90V is the voltage, in comparison with all the applied voltages according to the present measurement, having the smallest difference from the real starting voltage of the LED. This voltage is chosen as the reference voltage (Vr), because by choosing the smallest voltage that can drive the product, heat generation will be the smallest, and hence the influence of heat generated by the LED itself on measurement results will be minimum. In addition, other voltages can be chosen as the reference voltage. However, at higher voltages, heat generated will be relatively larger, influencing the measurement results. Thereby, theoretically, by adopting a higher voltage as the reference voltage, the errors in measurement will be larger. Consequently, choosing the smallest starting voltage as the reference voltage is a preferred choice.

Figure 2:
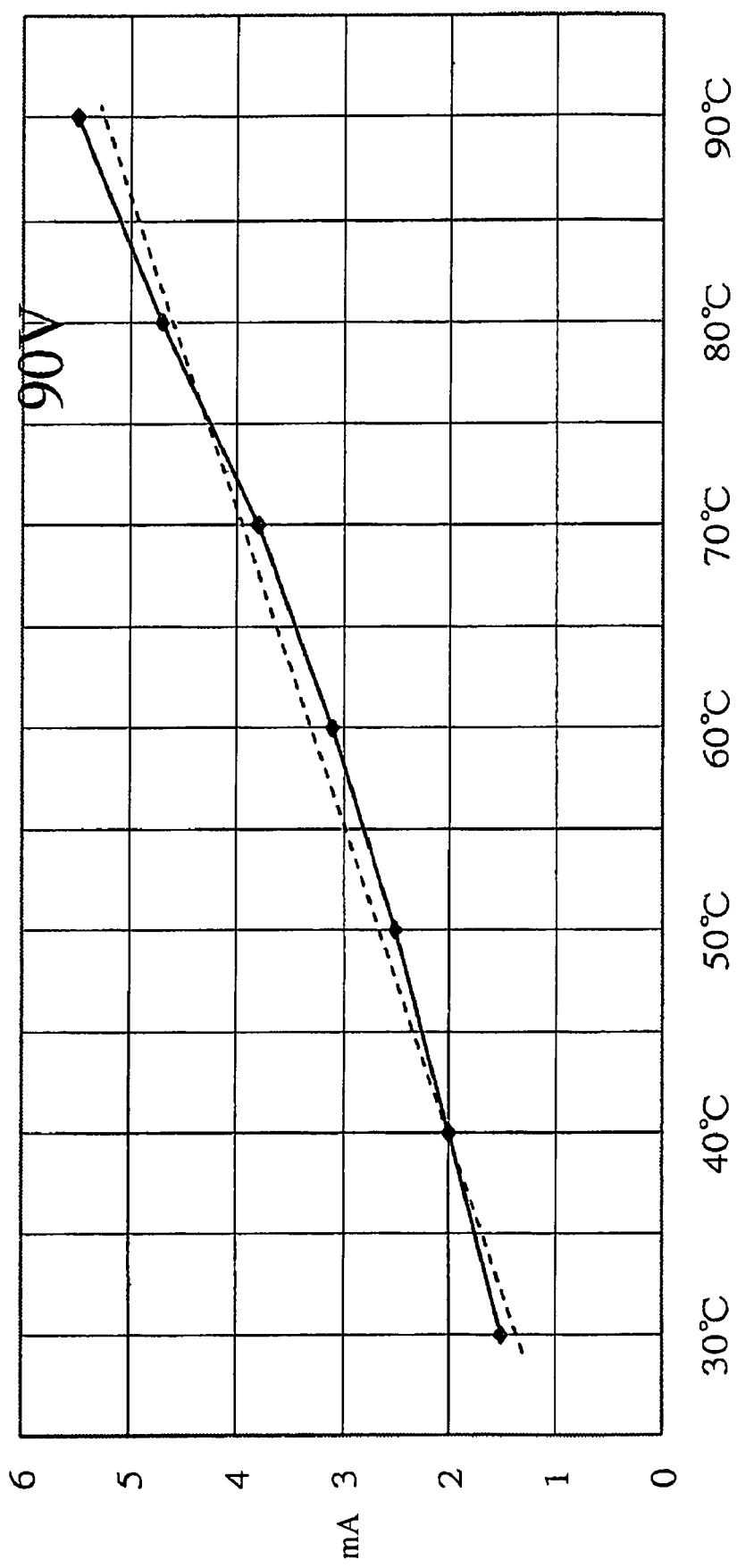
FIG. 2 shows curves under an applied voltage of 90V according to a preferred embodiment of the present invention.

FIG. 2 shows curves under an applied voltage of 90V according to a preferred embodiment of the present invention. As shown in the figure, the I-T curve of choosing 90V as the reference voltage according to the measuring method of the present invention is plotted in solid. This solid curve is not a straight line, but rather a roughly straight line. The straight line most close to the solid curve can be deduced by computation or graphical methods, shown as the dashed line in the figure. The dashed line in the figure is a closest straight line deduced by graphical observation method. The slope of the straight line can be computed by the graphical data, and is approximately $1/15$. That is to say, for every increase of 15° C., the current will increase by 1 mA. Beside, in order to deduce a straight line best fit to the experimental data, the least-square estimation can be used.

Figure 3A:
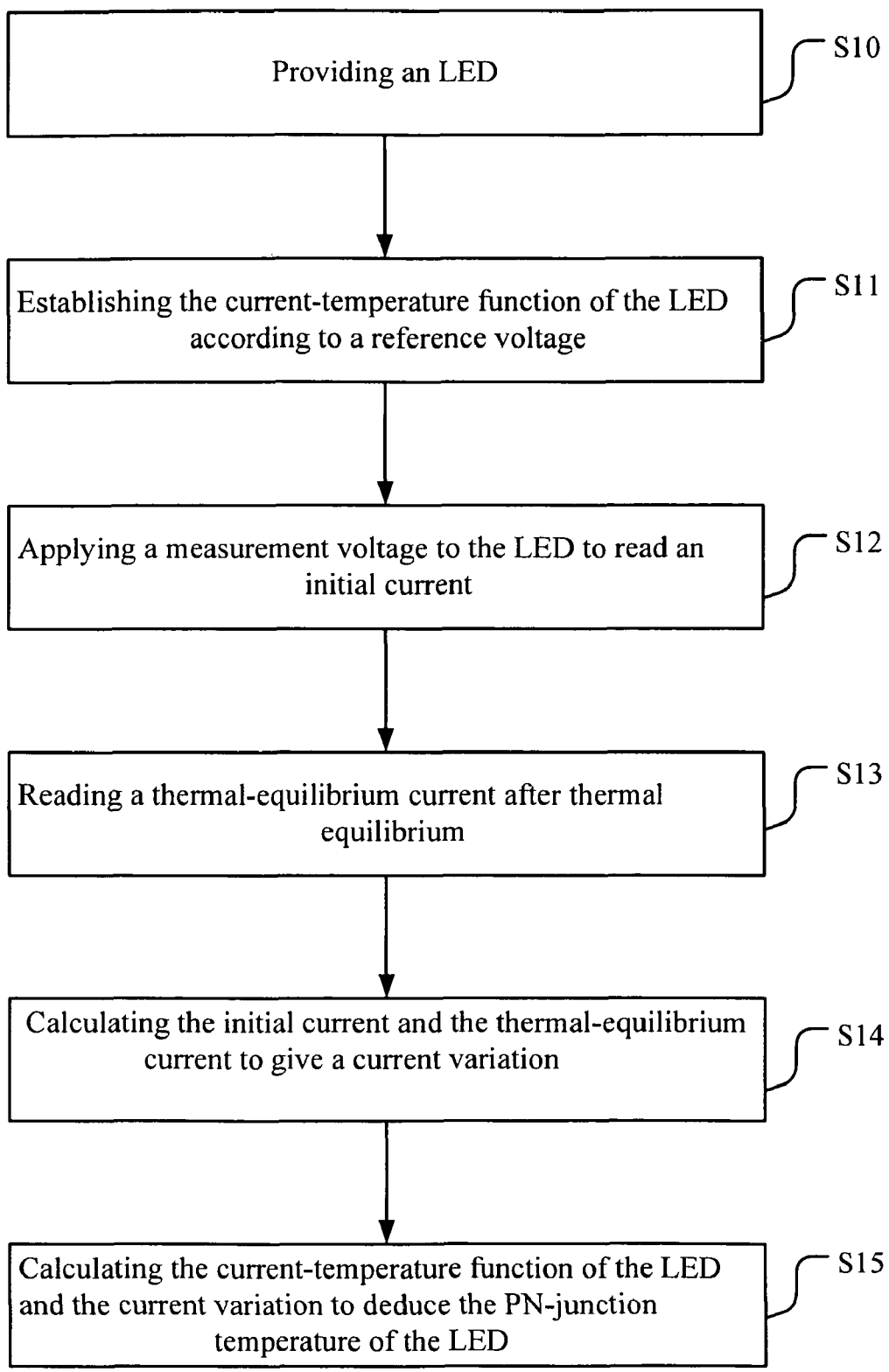
FIG. 3A shows a flowchart of a measuring method according to a preferred embodiment of the present invention.
Figure 3B:
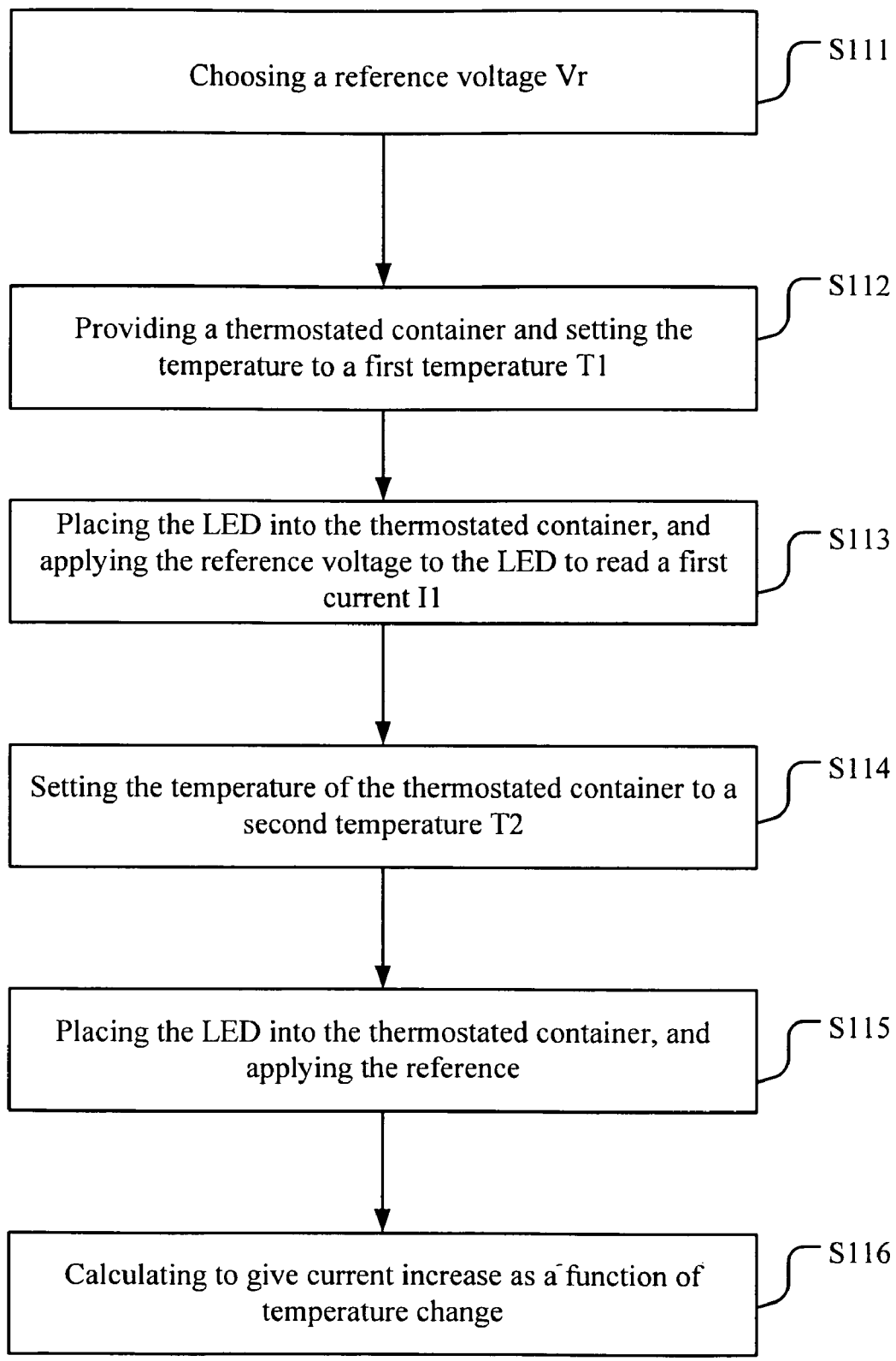
FIG. 3B shows a flowchart of establishing data according to a preferred embodiment of the present invention.

FIG. 3A shows a flowchart of a measuring method according to a preferred embodiment of the present invention. As shown in the figure, the method for measuring the PN-junction temperature of a LED according to the present invention comprises steps of:

S10: Providing an LED;

S11: Establishing the current-temperature function of the LED according to a reference voltage;

S12: Applying a measurement voltage to the LED to measure an initial current;

S13: Measuring a thermal-equilibrium current after thermal equilibrium;

S14: Calculating the initial current and the thermal-equilibrium current to give a current variation; and S15: Calculating the current-temperature function of the LED and the current variation to deduce the PN-junction temperature of the LED.

The step S11 described above further comprises steps of:

S111: Choosing a reference voltage Vr;

S112: Providing a thermostated container and setting the temperature to a first temperature T1;

S113: Placing the LED into the thermostated container, and when the temperature is stabilized, applying the reference voltage to the LED to measure a first current I1;

S114: Setting the temperature of the thermostated container to a second temperature T2;

S115: Placing the LED into the thermostated container, and when the temperature is stabilized, applying the reference voltage to the LED to measure a second current I2; and (the above two steps can be repeated to get more measurement results for correcting errors)

S116: Calculating to give current increase $\Delta I$ as a function of temperature change $\Delta T$, $K=\Delta I/\Delta T$, wherein K is a constant, $\Delta I=I2-I1$, and $\Delta T=T2-T1$.

In the step S12, set the temperature of the thermostated container to an initial temperature Ts, and place the LED into the thermostated container. After temperature equilibrium, apply a measurement voltage to the LED for measuring the initial current Is. In the step S13, after applying the measurement voltage for a while and thermal equilibrium being reached, measure the thermal-equilibrium current Ie. In the step S14, subtract the initial current Is from the thermal-equilibrium current Ie to give the current variation $\Delta I$. According to the function given by the step S116, $K=\Delta I/\Delta T$, the temperature change $\Delta T$ is given. In the step S15, by adding the initial temperature Ts and the temperature change $\Delta T$, the PN-junction temperature of the LED is thereby deduced.

Figure 4A:
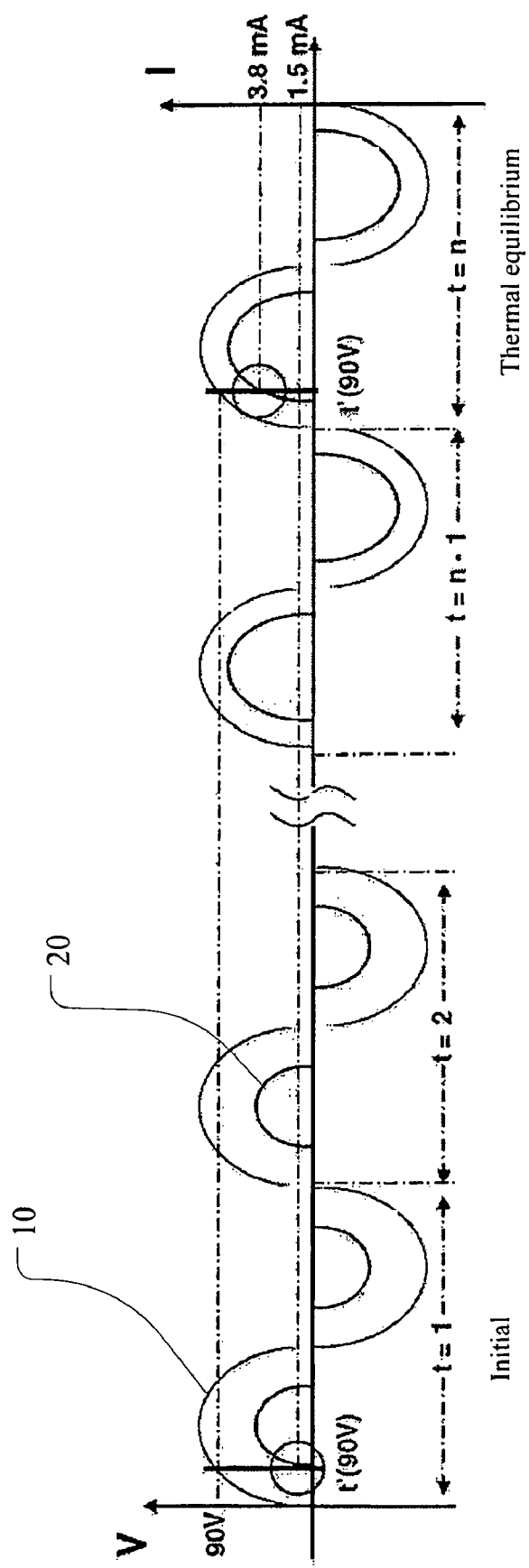
FIG. 4A shows a schematic diagram of voltage and current according to a preferred embodiment of the present invention.
Figure 4B:
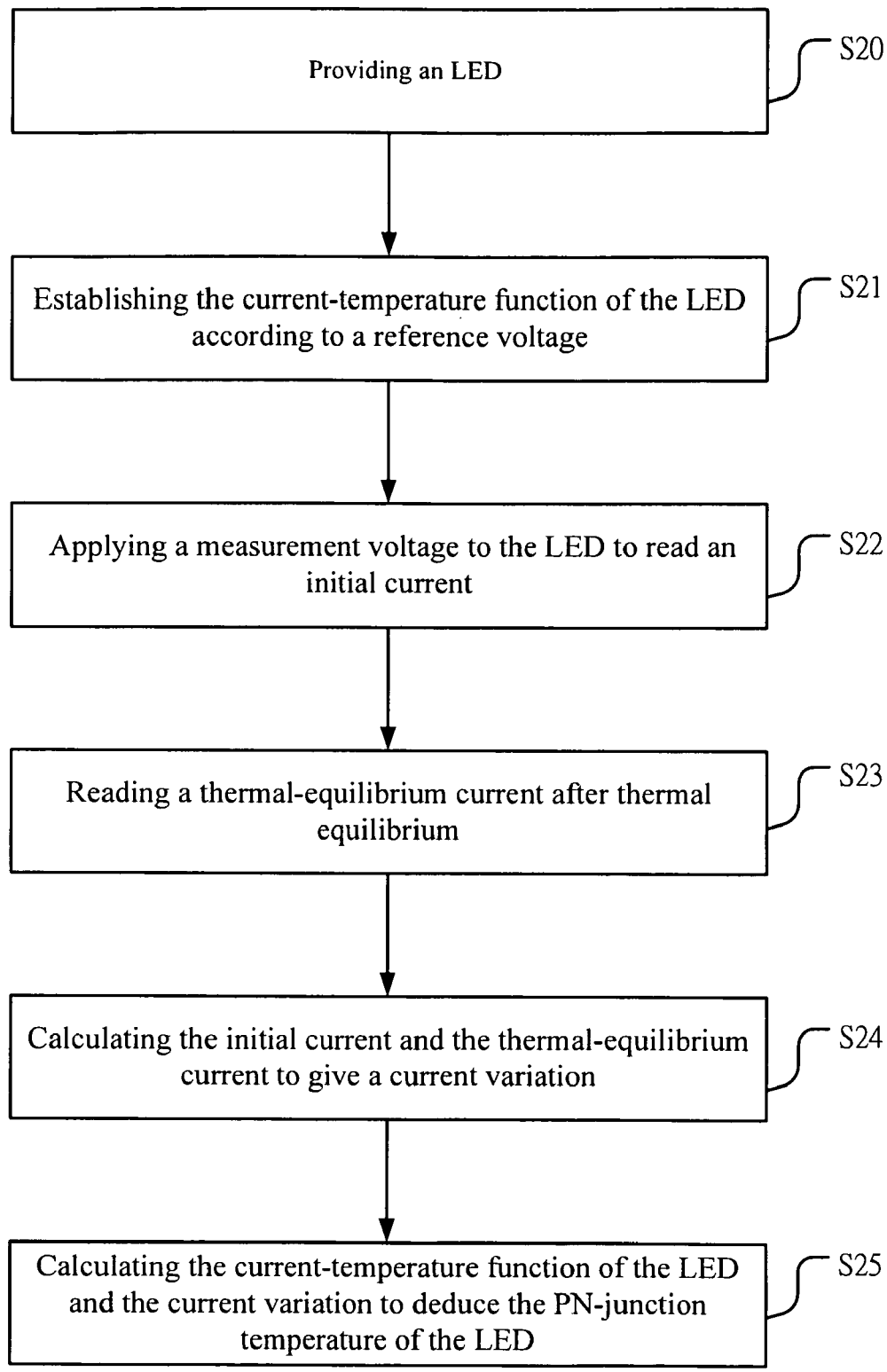
FIG. 4B shows a flowchart of a measuring method according to another preferred embodiment of the present invention.

FIG. 4A shows a schematic diagram of voltage and current according to a preferred embodiment of the present invention. As shown in the figure, the measurement voltage according to the present preferred embodiment is an AC voltage. Thereby, the sine wave 10 is the waveform of the AC voltage; while the arc 20 represents the waveform of the corresponding AC current. As shown in FIG. 4B, the measuring method according to the present preferred embodiment comprises the following steps:

S20: Providing an LED;

S21: Establishing the current-temperature function of the LED according to a reference voltage;

S22: Applying a measurement voltage to the LED to measure an initial current;

S23: Measuring a thermal-equilibrium current after thermal equilibrium;

S24: Calculating the initial current and the thermal-equilibrium current to give a current variation; and S25: Calculating the current-temperature function of the LED and the current variation to deduce the PN-junction temperature of the LED.

In the step S22, when applying the measurement voltage to the LED at beginning (t=1), measure the current corresponding to 90V as the initial current Is. In the step S23, after applying the measurement voltage for a while and thermal equilibrium being reached (t=n), measure the thermal-equilibrium current Ie. In the step S24, subtracting the initial current Is from the thermal-equilibrium current Ie gives the current variation $\Delta I$. In the step S25, according to the current variation $\Delta I$ and the pre-established current-temperature function, the temperature change $\Delta T$ can be given. Then, adding the temperature change $\Delta T$ with the ambient temperature gives the PN-junction temperature of the LED. The initial current Is is 1.5 mA; the thermal-equilibrium current Ie is 3.8 mA; the current variation $\Delta I$ is 3.8 mA minus 1.5 mA, which is 2.3 mA. According to the current-temperature function $K=\Delta I/\Delta T$, 2.3 mA:1 mA=$\Delta T$:15° C., it is deduced that the temperature change $\Delta T$ is 34.5° C. The PN-junction temperature of the LED is the initial temperature Ts plus the temperature change $\Delta T$. Thereby, adding 34.5° C. to the initial ambient temperature gives the thermal-equilibrium temperature of the LED.

The reference voltage described above adopts a DC voltage for using the DC characteristics as the reference. The DC characteristics described above can be used for measuring the PN-junction temperature of a DC LED. Besides, in addition to using a DC voltage as the reference voltage, an AC voltage can be adopted as well, as shown in FIGS. 5 to 7.

Figure 5A:
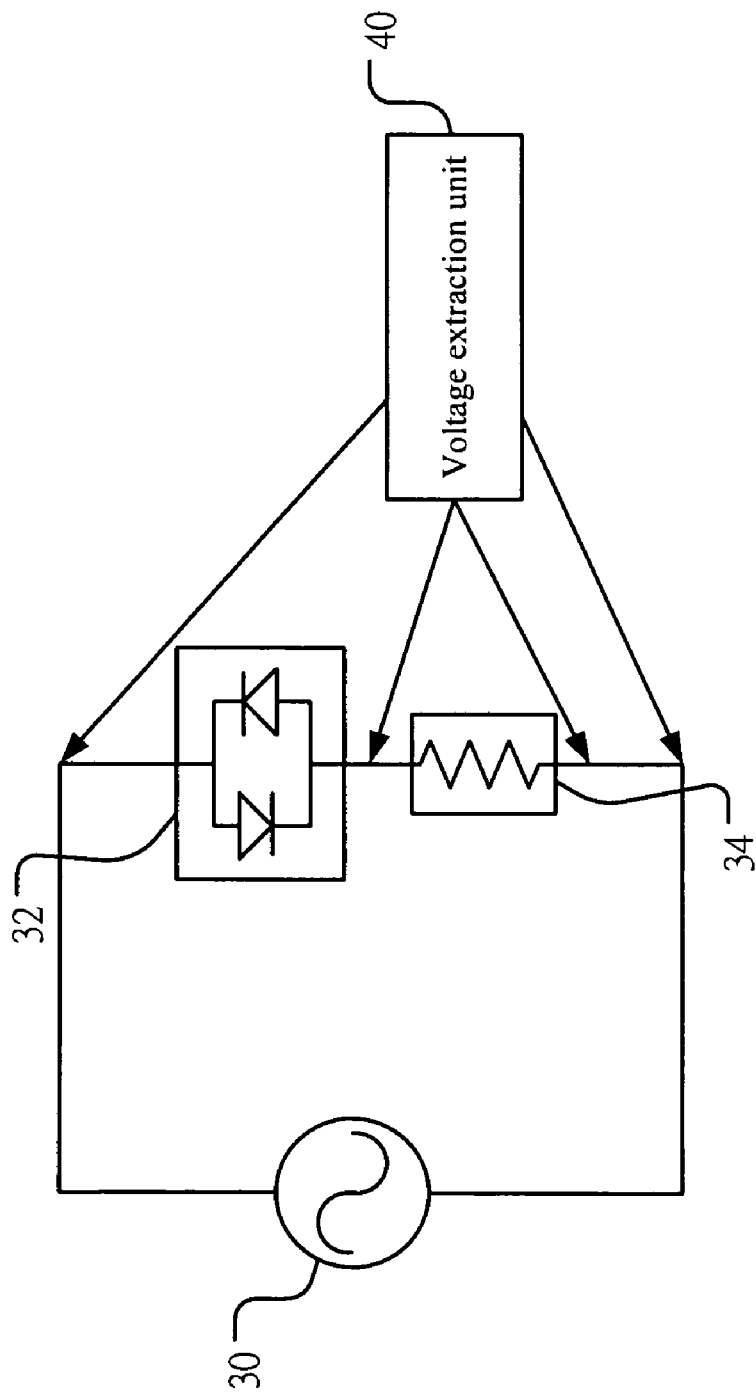
FIG. 5A shows a schematic diagram according to another preferred embodiment of the present invention.

FIG. 5A shows a schematic diagram according to another preferred embodiment of the present invention. As shown in the figure, the measuring method according to the present invention includes an AC power 30 coupled to an LED 32 and a load resistor 34. The LED 32 is coupled in series with the load resistor 34. The resistance of the LED 32 is much larger than that of the load resistor 34. For example, the resistance of the LED 32 is 60 K$\Omega$, while the resistance of the load resistance 34 is 60$\Omega$. Thereby, the voltage across the load resistor 34 is extremely small and hence is negligible in terms of voltage division. Besides, the current passing through the load resistor 34 is equal to that through the LED 32. A voltage extraction unit 40 is coupled between the AC power 30 and the LED 32 as well as between the AC power 30 and the load resistor 34. The voltage extraction unit 40 also is coupled across the load resistor 34. Thereby, the total voltage applied by the AC power 30 and the load voltage across the load resistor 34 can be extracted. In the following, the method for measuring the PN-junction temperature of an LED according to the present preferred embodiment is described.

Figure 5B:
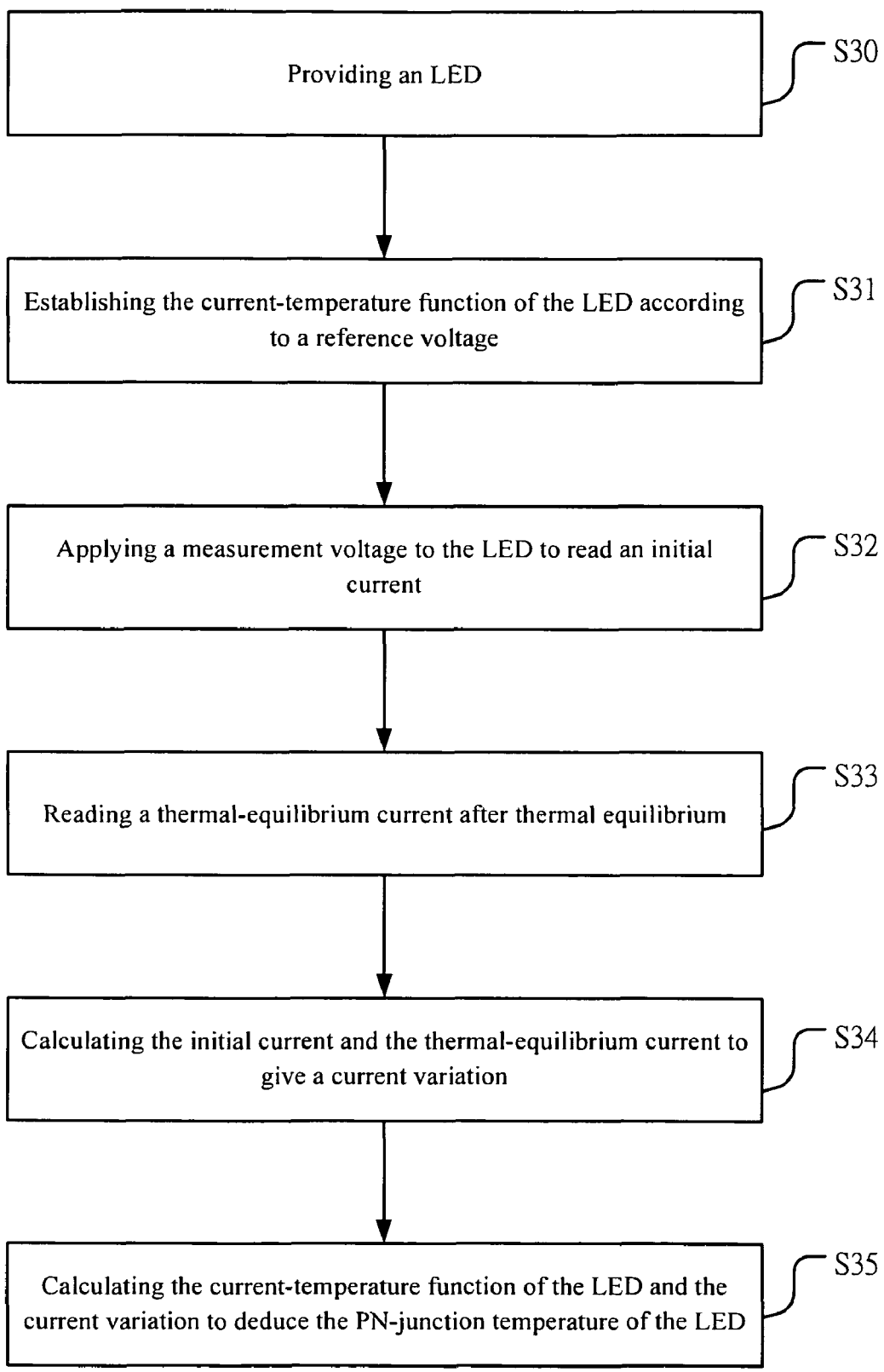
FIG. 5B shows a flowchart of a measuring method according to another preferred embodiment of the present invention.

As shown in FIG. 5B, the measuring method according to the present preferred embodiment comprises steps of:

S30: Providing an LED;

S31: Establishing the current-temperature function of the LED according to a reference voltage;

S32: Applying a measurement voltage to the LED to measure an initial current;

S33: Measuring a thermal-equilibrium current after thermal equilibrium;

S34: Calculating the initial current and the thermal-equilibrium current to give a current variation; and S35: Calculating the current-temperature function of the LED and the current variation to deduce the PN-junction temperature of the LED.

In the step S31, establish the current-temperature function of the LED according to the reference voltage provided by the AC power 30. In the step S32, when the measurement voltage begins to be applied (t=1) and the AC power 30 is operated at 90V, the initial load voltage VR1 across the load resistor 34 is extracted to be 0.09V. Hence, the initial current I1 passing through the load resistor 34 at this time is 0.09V/60Ω=0.0015 A=1.5 mA. Because the resistance $R_{LED}$ of the LED 32 is much larger than that ($R_1$) of the load resistor 34, the load voltage VR1 of the load resistor 34 will not influence the whole voltage. In the step S33, when the AC power 30 applies the measurement voltage until thermal equilibrium (t=n) and the AC power 30 is operated at 90V, the voltage extraction unit 40 extracts simultaneously the thermal-equilibrium load voltage across the load resistor VRn to be 0.228V. At this time, the thermal-equilibrium current In passing through the load resistor 34 is 0.228V/60Ω=0.0038 A=3.8 mA. In the step S34, compute the initial current I1 and the thermal-equilibrium In to give the current variation ΔI, namely, ΔI=In−I1=2.3 mA. In the step S35, substitute the current variation ΔI into the current-temperature function, namely, substitute ΔI=2.3 mA into K=1 mA/15° C.=ΔI/ΔT, to give ΔT=34.5° C. Thereby, the PN-junction temperature of the LED 32 is the initial temperature Ts plus the temperature variation ΔT, which is equal to the initial temperature Ts plus 34.5° C.

Figure 6A:
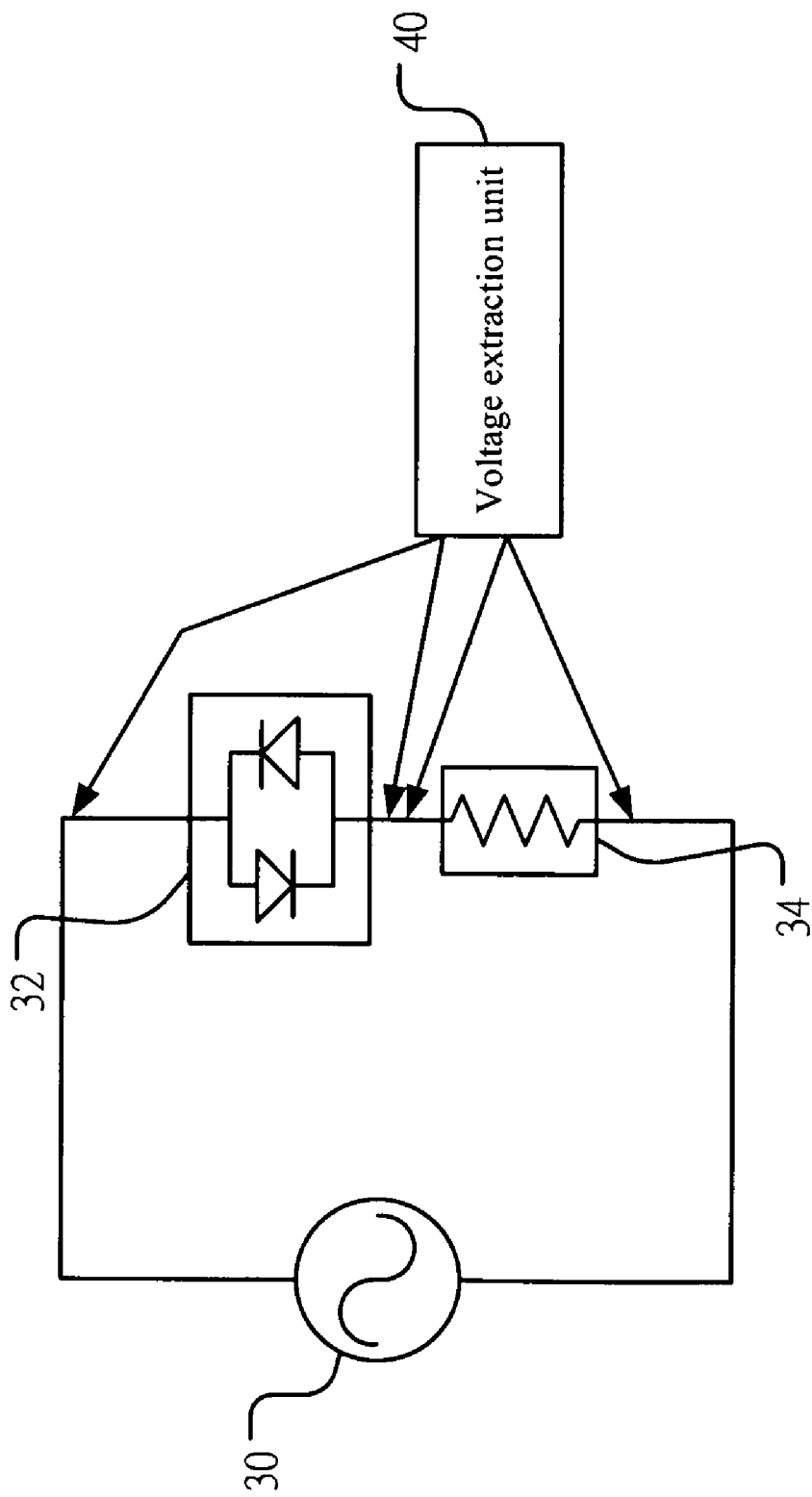
FIG. 6A shows a schematic diagram according to another preferred embodiment of the present invention.

FIG. 6A shows a schematic diagram according to another preferred embodiment of the present invention. The difference between FIG. 5A and FIG. 6A is that the voltage extraction unit 40 of FIG. 5A extracts the total voltage applied by the AC power 30 and the voltage across the load resistor 34. On the other hand, the voltage extraction unit 40 of FIG. 6A extracts the voltages across the LED 32 and across the load resistor 34, respectively. Thereby, the voltage extraction unit 40 of FIG. 6A is coupled on both terminals of the LED 32 and of the load resistor 34, respectively. The method for measuring the PN-junction of an LED according to the present preferred embodiment is described as follows.

Figure 6B:
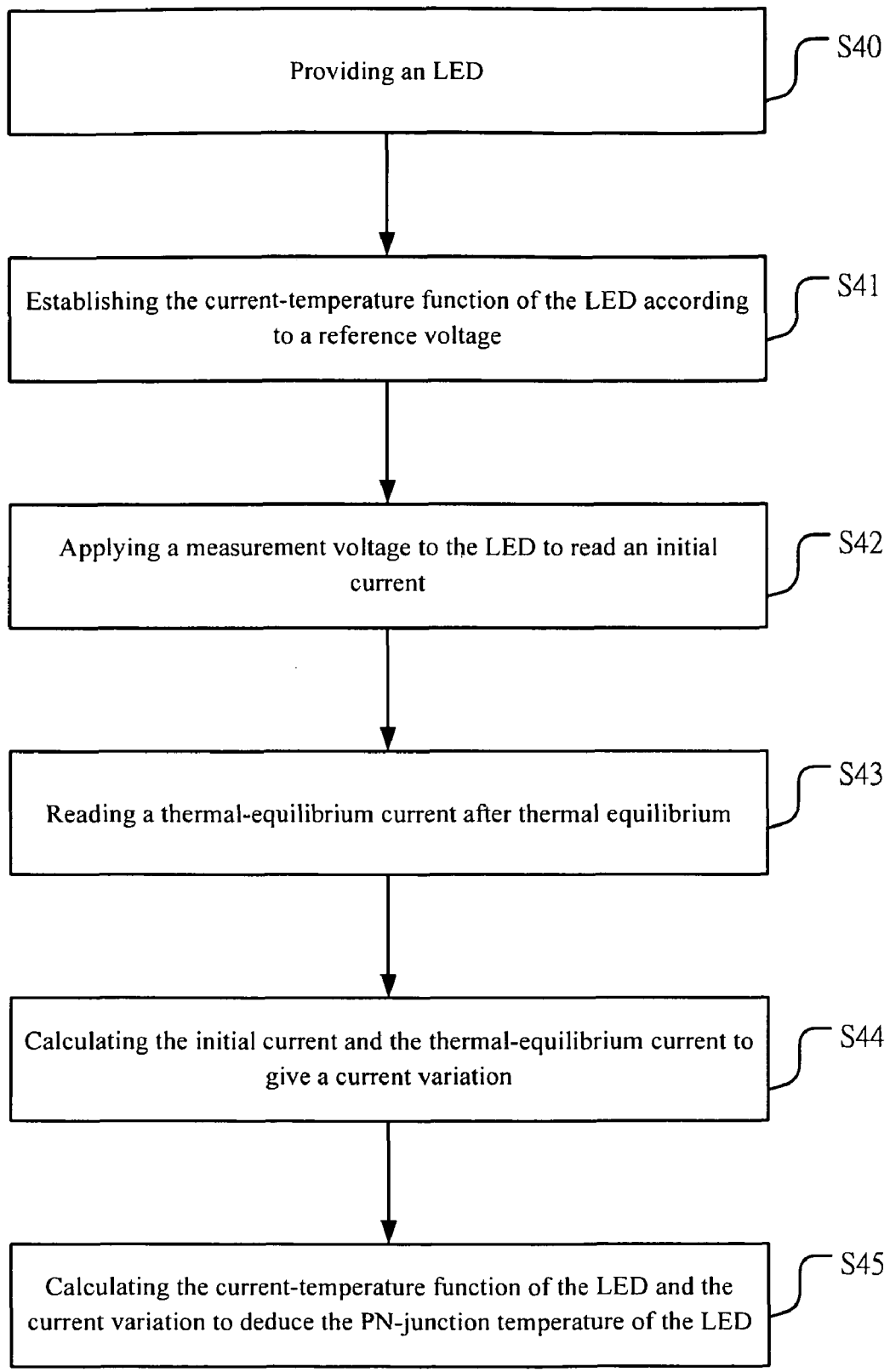
FIG. 6B shows a flowchart of a measuring method according to another preferred embodiment of the present invention.

As shown in FIG. 6B, the measuring method according to the present preferred embodiment comprises steps of:
S40: Providing an LED;
S41: Establishing the current-temperature function of the LED according to a reference voltage;
S42: Applying a measurement voltage to the LED to measure an initial current;
S43: Measuring a thermal-equilibrium current after thermal equilibrium;
S44: Calculating the initial current and the thermal-equilibrium current to give a current variation; and
S45: Calculating the current-temperature function of the LED and the current variation to deduce the PN-junction temperature of the LED.

In the step S41, establish the current-temperature function of the LED according to the reference voltage provided by the AC power 30. In the step S42, when the AC power 30 begins to be applied (t=1) and the measurement voltage is operated at 90V, the initial load voltage VR1 across the load resistor 34 is extracted to be 0.09V. Hence, the initial current I1 passing through the load resistor 34 at this time is 0.09V/60Ω=0.0015 A=1.5 mA. Because the resistance $R_{LED}$ of the LED 32 is much larger than that ($R_1$) of the load resistor 34, the load voltage VR1 of the load resistor 34 will not influence the whole voltage. In the step S43, when the AC power 30 applies the measurement voltage until thermal equilibrium (t=n) and the measurement voltage applied across the LED 32 is operated at 90V, the voltage extraction unit 40 extracts simultaneously the thermal-equilibrium load voltage across the load resistor VRn to be 0.228V. At this time, the thermal-equilibrium current In passing through the load resistor 34 is 0.228V/60Ω=0.0038 A=3.8 mA. In the step S44, compute the initial current I1 and the thermal-equilibrium In to give the current variation ΔI, namely, ΔI=In−I1=2.3 mA. In the step S45, substitute the current variation ΔI into the current-temperature function, namely, substitute ΔI=2.3 mA into K=1 mA/15° C.=ΔI/ΔT, to give ΔT=34.5° C. Thereby, the PN-junction temperature of the LED 32 is the initial temperature Ts plus the temperature variation ΔT, which is equal to the initial temperature Ts plus 34.5° C.

Figure 7A:
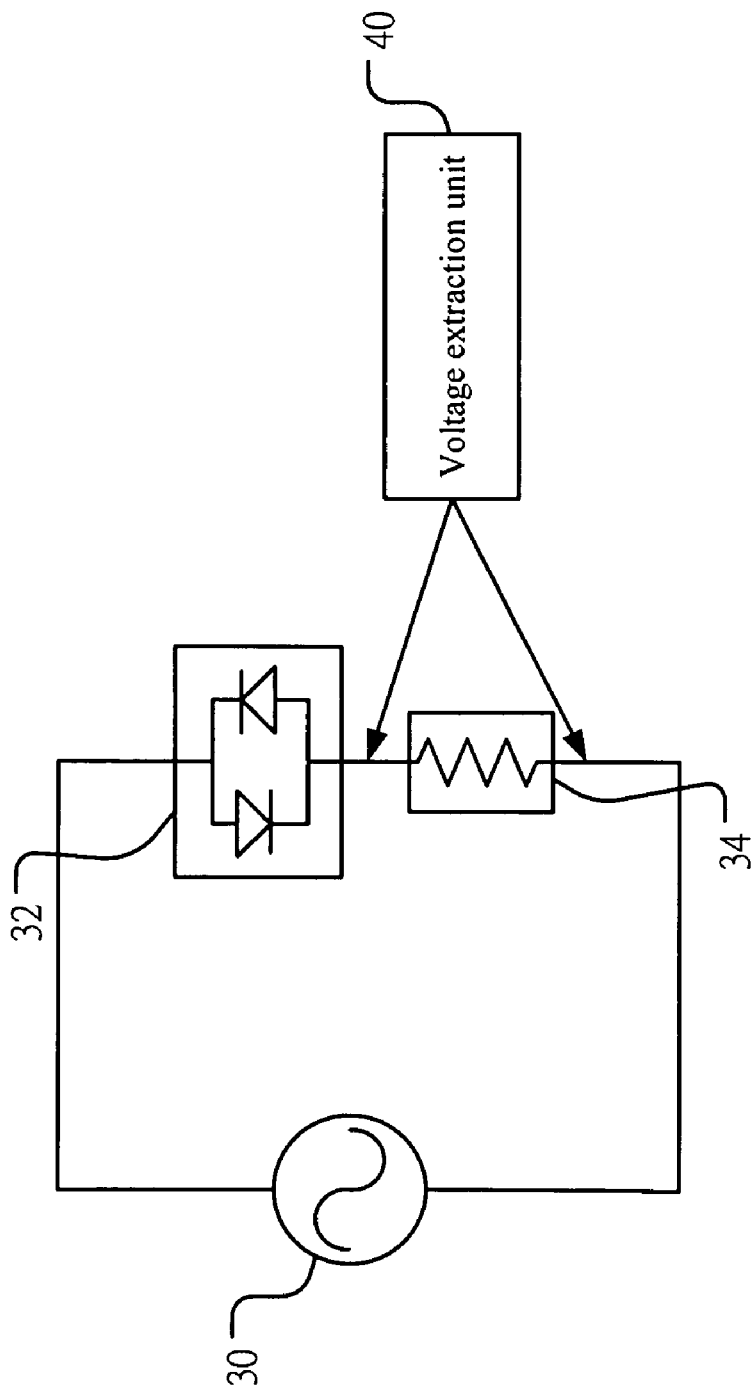
FIG. 7A shows a schematic diagram according to another preferred embodiment of the present invention.

FIG. 7A shows a schematic diagram according to another preferred embodiment of the present invention. The difference between FIG. 6A and FIG. 7A is that the voltage extraction unit 40 of FIG. 6A extracts the voltages across the LED 32 and across the load resistor 34, respectively. On the other hand, the voltage extraction unit 40 of FIG. 7A extracts the voltage across the load resistor 34 only. Thereby, the voltage extraction unit 40 of FIG. 7A is coupled only on both terminals of the load resistor 34. The method for measuring the PN-junction of an LED according to the present preferred embodiment is described as follows.

Figure 7B:
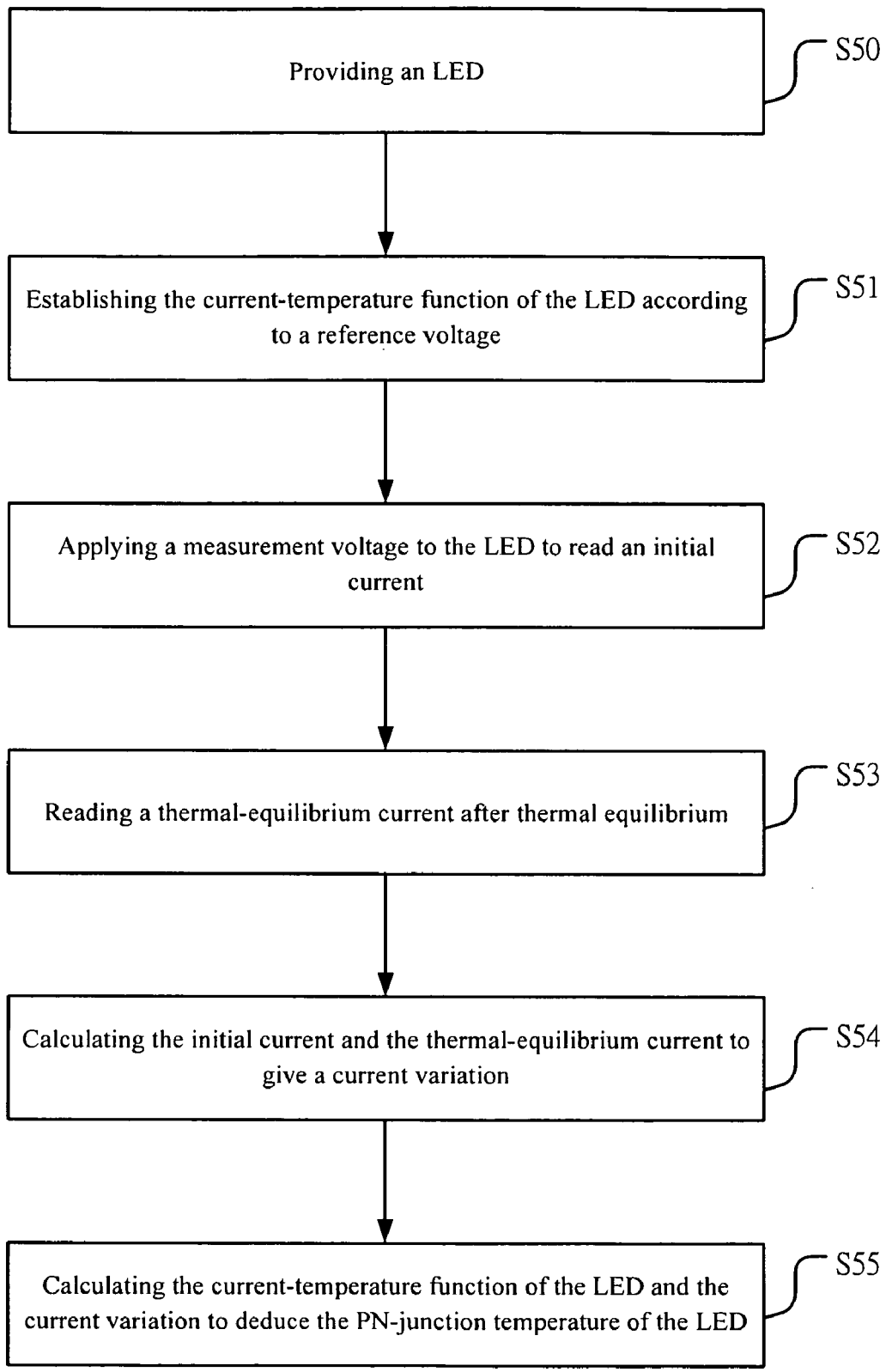
FIG. 7B shows a flowchart of a measuring method according to another preferred embodiment of the present invention.

As shown in FIG. 7B, the measuring method according to the present preferred embodiment comprises steps of:
S50: Providing an LED;
S51: Establishing the current-temperature function of the LED according to a reference voltage;
S52: Applying a measurement voltage to the LED to measure an initial current;
S53: Measuring a thermal-equilibrium current after thermal equilibrium;
S54: Calculating the initial current and the thermal-equilibrium current to give a current variation; and
S55: Calculating the current-temperature function of the LED and the current variation to deduce the PN-junction temperature of the LED.

In the step S51, establish the current-temperature function of the LED according to the reference voltage provided by the AC power 30. In the step S52, when the measurement voltage begins to be applied (t=1), the AC peak voltage across the load resistor 34 is extracted to be 0.156V. At this moment, the operation peak voltage of the LED 32 is 156V It is deducible that when the measurement voltage applied on the LED 32 is 90V, the initial load voltage across the load resistor 34 at that time is VR1=0.156*(90/156)=0.09V. Hence, the initial current I1 passing through the load resistor 34 at this time is 0.09V/60Ω=0.0015 A=1.5 mA. Because the resistance $R_{LED}$ of the LED 32 is much larger than that ($R_1$) of the load resistor 34, the load voltage VR1 of the load resistor 34 will not influence the whole voltage. In the step S53, when the AC power 30 applies the measurement voltage until thermal equilibrium (t=n), the AC peak voltage across the load resistor 34 is extracted to be 0.395V. At this moment, the operation peak voltage on the LED 32 is 156V It is deducible that when the measurement voltage applied on the LED 32 is 90V, the thermal-equilibrium load voltage across the load resistor 34 at that time is VRn=0.395*(90/156)=0.228V. At this time, the thermal-equilibrium current In passing through the load resistor 34 is 0.228V/60Ω=0.0038 A=3.8 mA. In the step S54, compute the initial current I1 and the thermal-equilibrium In to give the current variation ΔI, namely, ΔI=In−I1=2.3 mA. In the step S55, substitute the current variation ΔI into the current-temperature function, namely, substitute ΔI=2.3 mA into K=1 mA/15° C.=ΔI/ΔT, to give ΔT=34.5° C. Thereby, the PN-junction temperature of the LED 32 is the initial temperature Ts plus the temperature variation ΔT, which is equal to the initial temperature Ts plus 34.5° C.

Figure 8A:
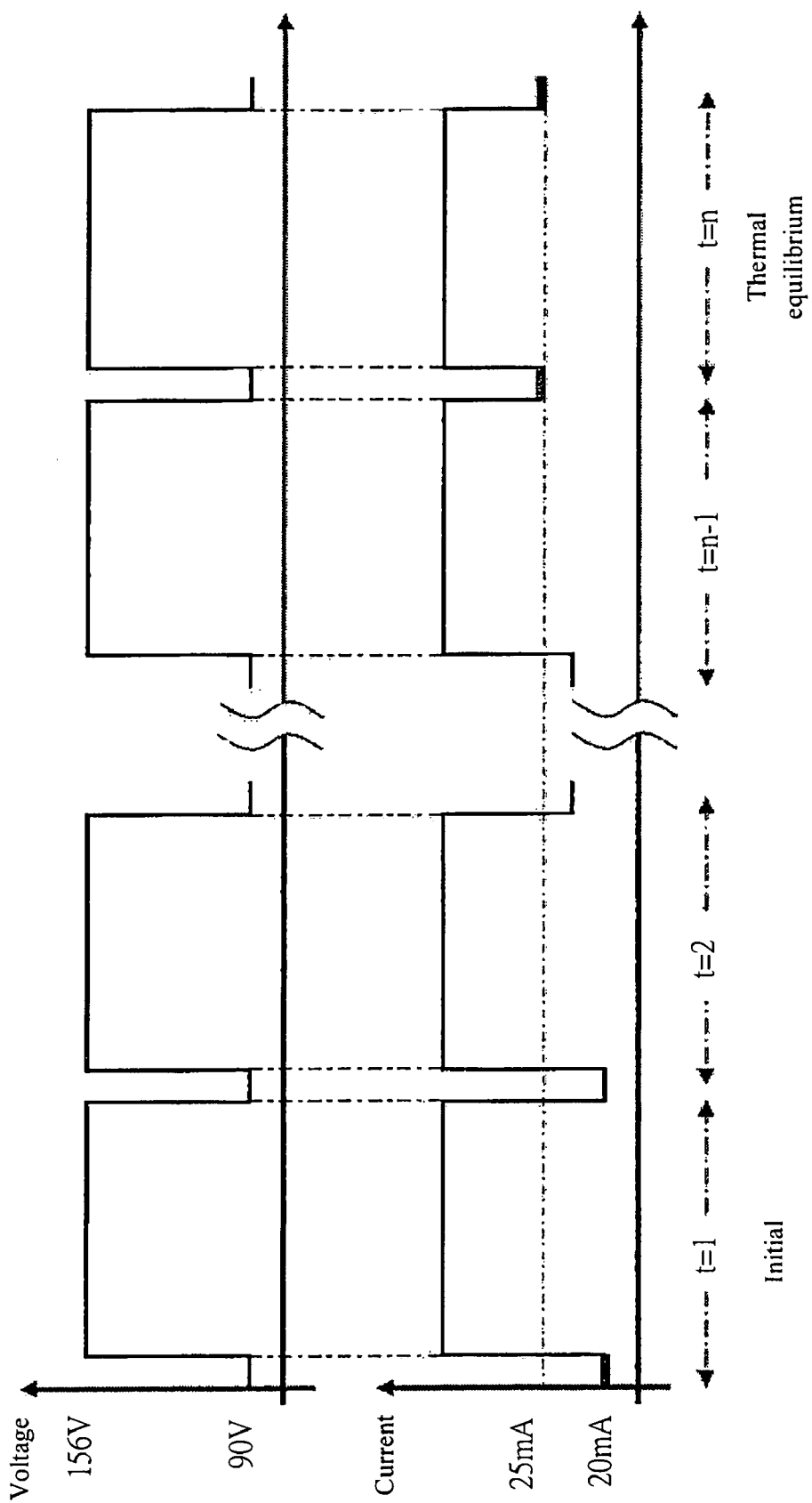
FIG. 8A shows curves according to another preferred embodiment of the present invention.

FIG. 8A shows curves according to another preferred embodiment of the present invention. As shown in the figure, the measuring method according to the present invention can be applied to measuring a DC LED. The DC LED according to the present preferred embodiment adopts one set of the LED chips described in the AC LED according to the previous preferred embodiments. During the measuring process, a rated voltage is applied across the DC LED and a measurement voltage is applied interleavingly for acquiring the initial current and the thermal-equilibrium current. For example, apply 156V rated DC voltage to the DC LED, and apply 90V DC voltage interleaving at a fixed period to the DC LED. Because the LED under test in the present preferred embodiment is one set of the LED chips described in the previous preferred embodiments, the current-temperature function used in the present preferred embodiment can adopts the measurement results in Table 1. In addition, in order to avoid errors in temperature, the present preferred embodiment uses the contents established in Table 3 and FIG. 2 to measure the PN-junction temperature of the DC LED.

Figure 8B:
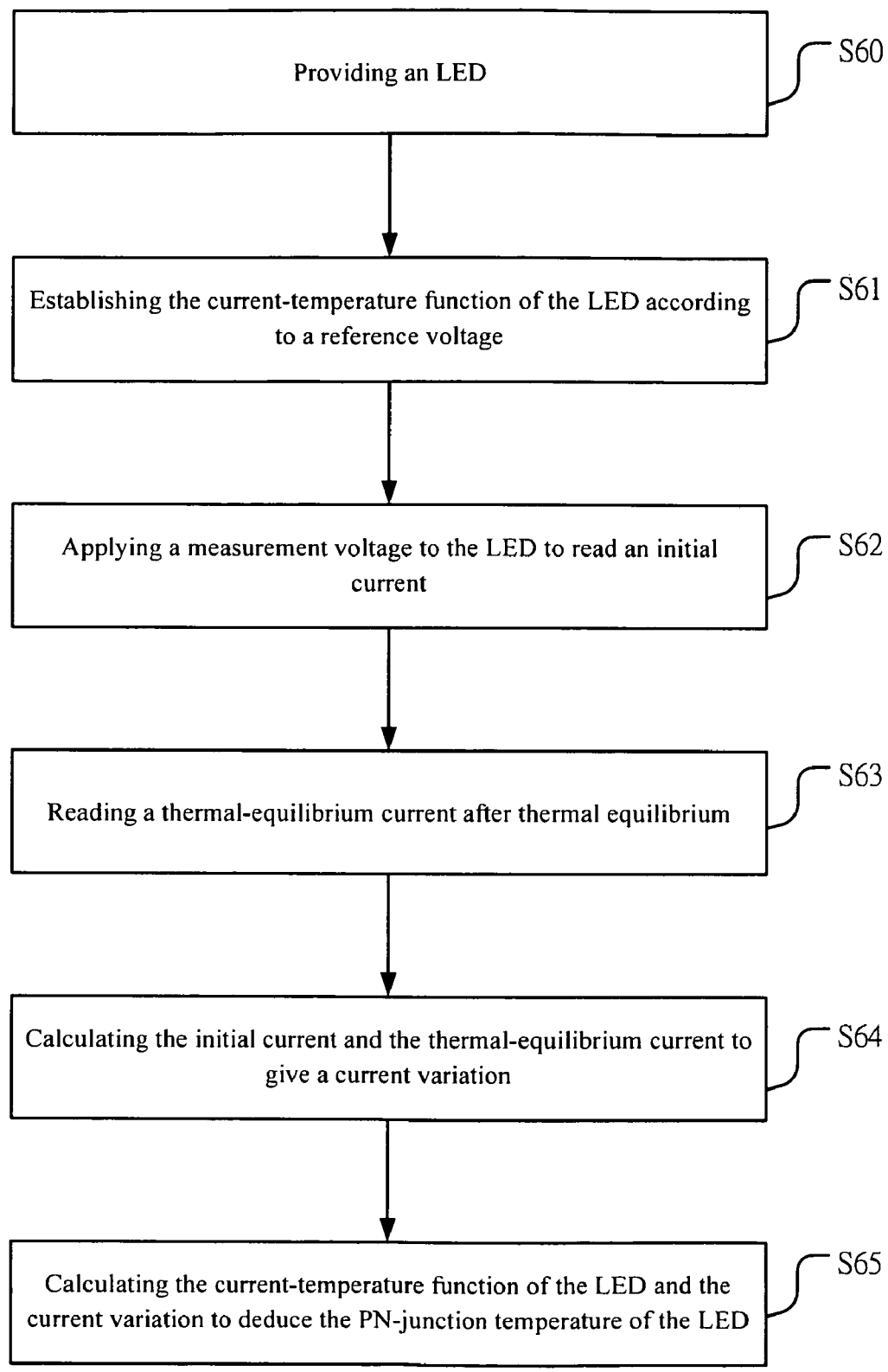
FIG. 8B shows a flowchart of a measuring method according to another preferred embodiment of the present invention.

As shown in FIG. 8B, the measuring method according to the present preferred embodiment comprises steps of:

S60: Providing an LED;
S61: Establishing the current-temperature function of the LED according to a reference voltage;
S62: Applying a measurement voltage to the LED to measure an initial current;
S63: Measuring a thermal-equilibrium current after thermal equilibrium;
S64: Calculating the initial current and the thermal-equilibrium current to give a current variation; and
S65: Calculating the current-temperature function of the LED and the current variation to deduce the PN-junction temperature of the LED.

In the step S62, firstly, apply 90V DC voltage on the LED to acquire the initial current Is. Then, continuously apply 156V rated voltage to the LED and apply 90V DC voltage in every period. In the Step 63, after applying the rated voltage 156V to the LED and reaching thermal equilibrium, apply 90V DC voltage to the LED again to get the thermal-equilibrium current Ie. The method for judging the thermal-equilibrium current Ie is when applying 90V DC voltage to the LED and the current passing through the LED is a stable current, then the current is judged to be the thermal-equilibrium current Ie. In the step S64, subtracting the initial current Is from the thermal-equilibrium current Ie gives the current variation ΔI. In the step S65, compare the current variation ΔI to the pre-established current-temperature function to give the temperature change ΔT. Finally, adding the temperature change ΔT to the ambient temperature gives the PN-junction temperature of the LED.

The initial current Is is 20 mA; the thermal-equilibrium current Ie is 25 mA. The current variation ΔI is 25 mA–20 mA=5.0 mA. 5.0 mA:1 mA=ΔT:15° C., it is deduced that the temperature change ΔT is 75° C. Adding 75° C. to the ambient temperature gives the PN-junction temperature of the LED.

The preferred embodiments described above use the initial current Is and the thermal-equilibrium current Ie to deduce the current variation ΔI. Then the current-temperature function and the current variation ΔI are used to deduce the temperature change ΔT for further deducing the PN-junction temperature of the LED. Besides, parameters such as real power, power factor, and driving-time interval between positive and negative half-waves can also be used for deducing the PN-junction temperature of an LED. In the following preferred embodiments, examples using real power, power factor, and driving-time interval between positive and negative half-waves are described, respectively.

Figure 9A:
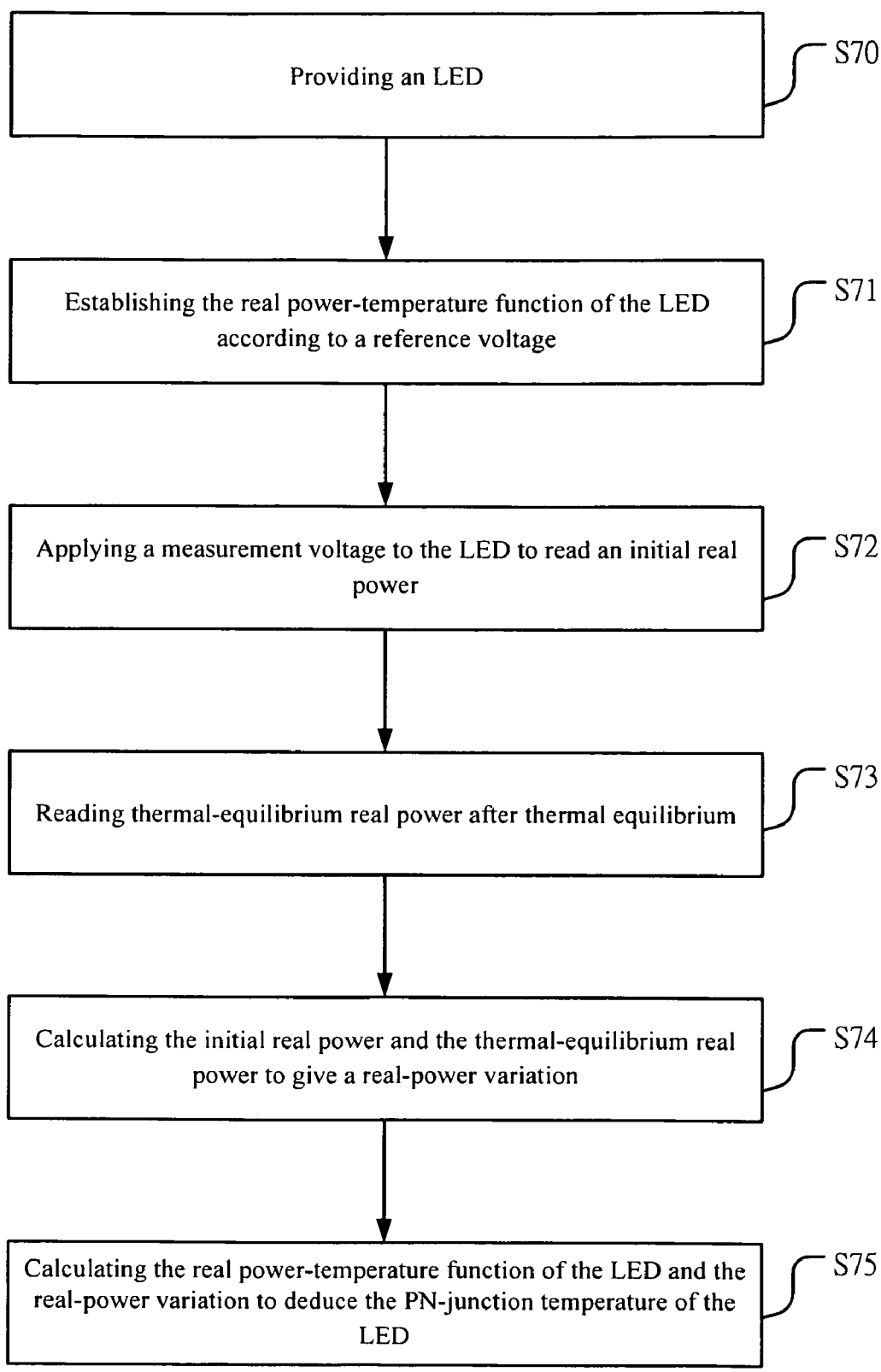
FIG. 9A shows a flowchart of a measuring method according to another preferred embodiment of the present invention.

FIG. 9A shows a flowchart of a measuring method according to another preferred embodiment of the present invention. As shown in FIG. 9A, the measuring method according to the present preferred embodiment comprises steps of:

S70: Providing an LED;
S71: Establishing the real power-temperature function of the LED according to a reference voltage;
S72: Applying a measurement voltage to the LED to measure an initial real power;
S73: Measuring thermal-equilibrium real power after thermal equilibrium;
S74: Calculating the initial real power and the thermal-equilibrium real power to give a real-power variation; and
S75: Calculating the real power-temperature function of the LED and the real-power variation to deduce the PN-junction temperature of the LED.

In the step 71, apply a rated AC voltage as the reference voltage for establishing the real power-temperature function. The measurement results are shown in Table 4.

TABLE 4

| | Temperature (° C.) | | | | | | |
|---|---|---|---|---|---|---|---|
| | 30 | 40 | 50 | 60 | 70 | 80 | 90 |
| Real Power (W) | 6.26038 | 6.41899 | 6.58561 | 6.75673 | 6.89949 | 7.06414 | 7.21635 |

Figure 9B:
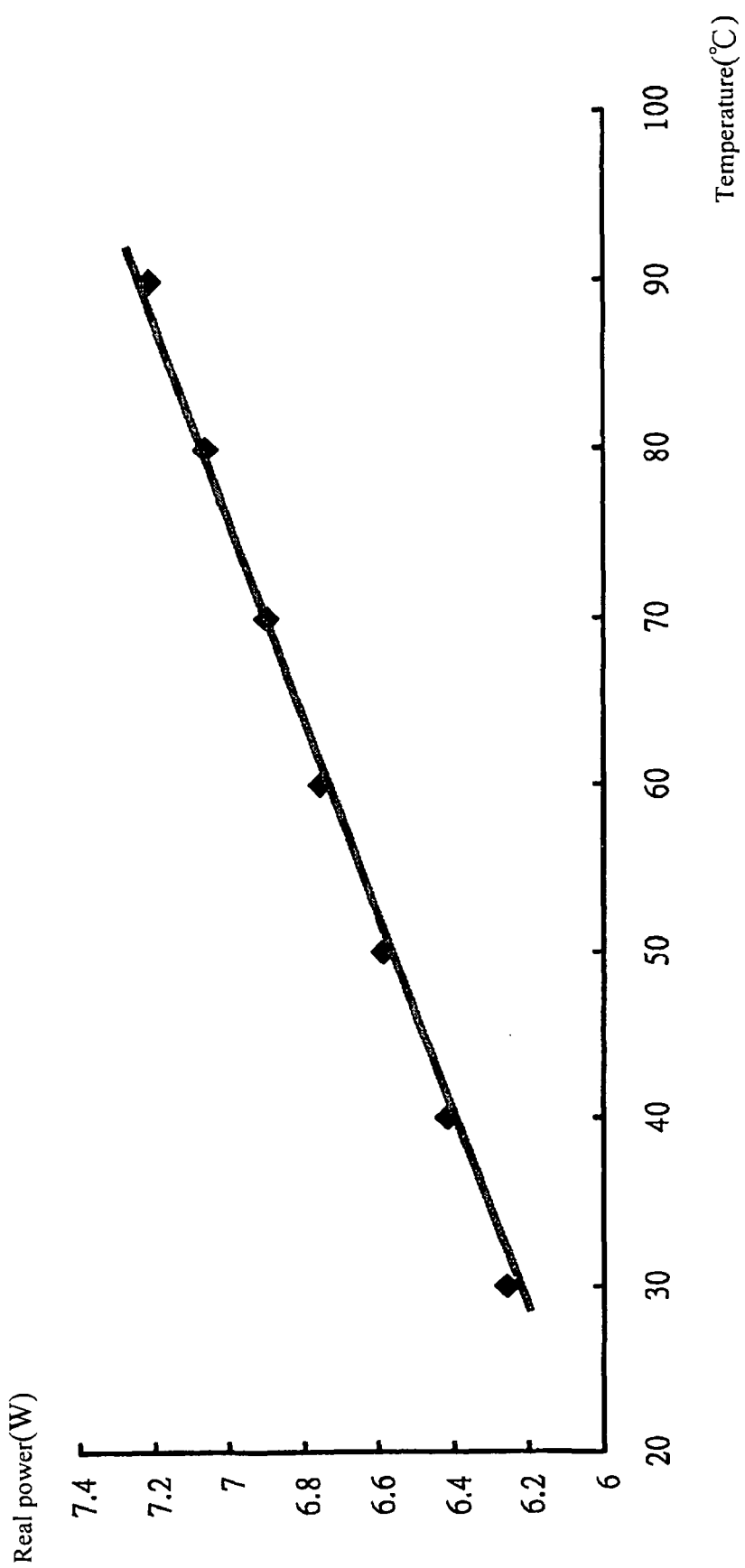
FIG. 9B shows a curve according to another preferred embodiment of the present invention.

FIG. 9B shows a curve plotted according to the measurement results in Table 4. At 90° C., the measured real power RP90 is 7.21635 W; at 30° C., the measured real power RP30 is 6.26038 W. It is thereby deduced K=ΔRP/ΔT=(7.21635−6.26038)/(90−30)=0.016. In the step S72, apply a rated AC voltage as the measurement voltage. At the initial temperature Ts, the initial real power RP1 is measured. In the step S73, after thermal equilibrium, the thermal-equilibrium real power RPn is measured. In the step S74, calculate RPn−RP1 to give the real-power variation ΔRP. In the step S75, referring to the real power-temperature function and the real-power variation ΔRP, the temperature change is calculated as ΔT=ΔRP/K=ΔRP/0.016. Then, adding the calculated temperature change ΔT to the initial temperature Ts gives the PN-junction temperature of the LED.

Figure 10A:
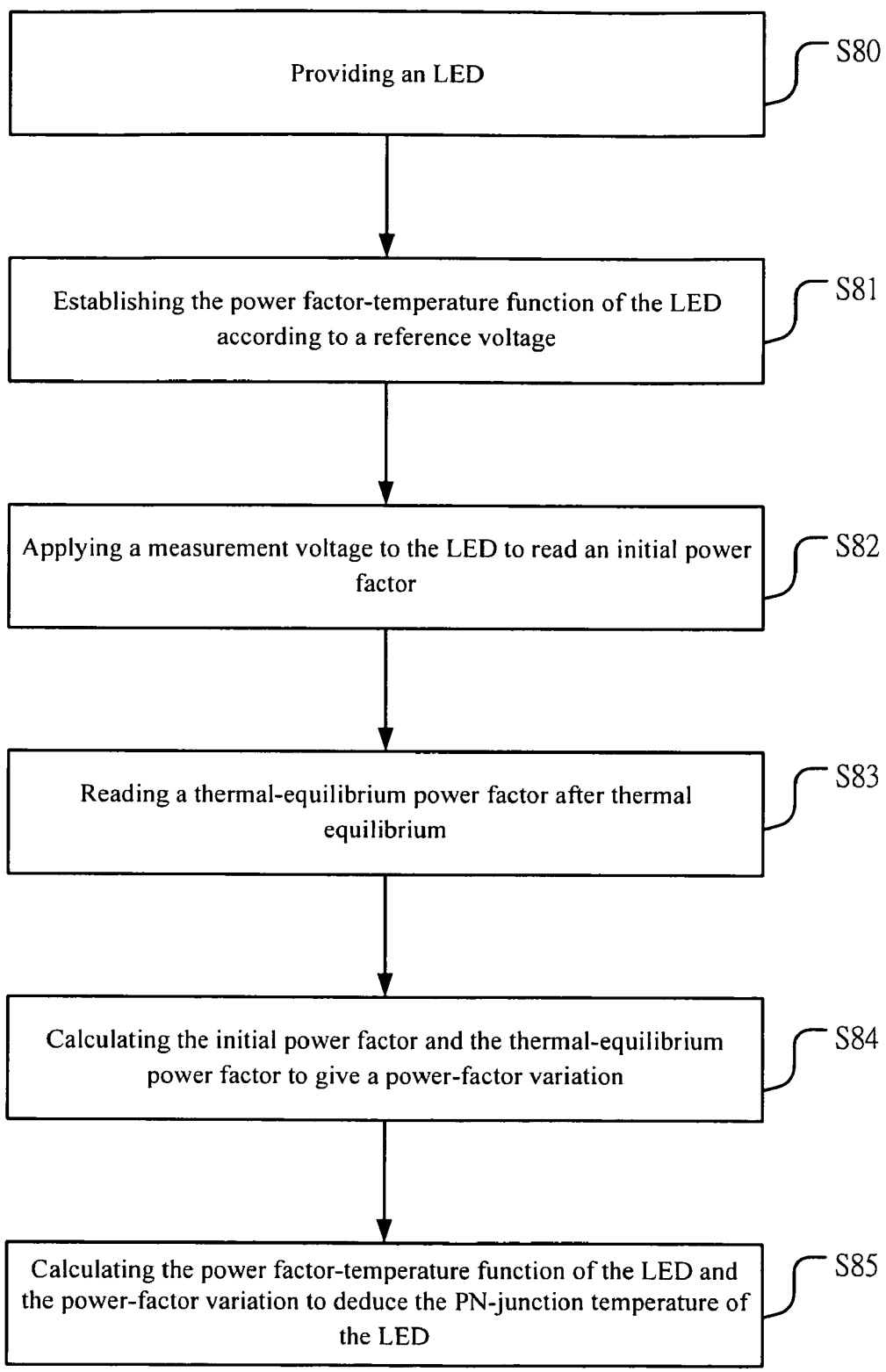
FIG. 10A shows a flowchart of a measuring method according to another preferred embodiment of the present invention.

FIG. 10A shows a flowchart of a measuring method according to another preferred embodiment of the present invention. As shown in FIG. 10A, the measuring method according to the present preferred embodiment comprises steps of:

S80: Providing an LED;
S81: Establishing the power factor-temperature function of the LED according to a reference voltage;
S82: Applying a measurement voltage to the LED to measure an initial power factor;
S83: Measuring a thermal-equilibrium power factor after thermal equilibrium;
S84: Calculating the initial power factor and the thermal-equilibrium power factor to give a power-factor variation; and
S85: Calculating the power factor-temperature function of the LED and the power-factor variation to deduce the PN-junction temperature of the LED.

The measuring method according to the present preferred embodiment uses the power factor-temperature function to deduce the PN-junction temperature of an LED. The basic theory of power factor is:

Total Power (TP)=Real Power (RP)+Reactive Power;

Power Factor (PF)=RP/TP.

In the step S81, apply a rated AC voltage as the reference voltage for establishing the power factor-temperature function. The measurement results are listed in Table 5 as follows.

TABLE 5

| | Temperature (° C.) | | | | | | |
|---|---|---|---|---|---|---|---|
| | 30 | 40 | 50 | 60 | 70 | 80 | 90 |
| Real Power (W) | 6.26038 | 6.41899 | 6.58561 | 6.75673 | 6.89949 | 7.06414 | 7.21635 |
| Total Power (W) | 6.87181 | 7.03431 | 7.19851 | 7.37506 | 7.51969 | 7.68427 | 7.83694 |
| Power Factor | 0.91102 | 0.91253 | 0.91486 | 0.91616 | 0.91752 | 0.9193 | 0.92081 |

Figure 10B:
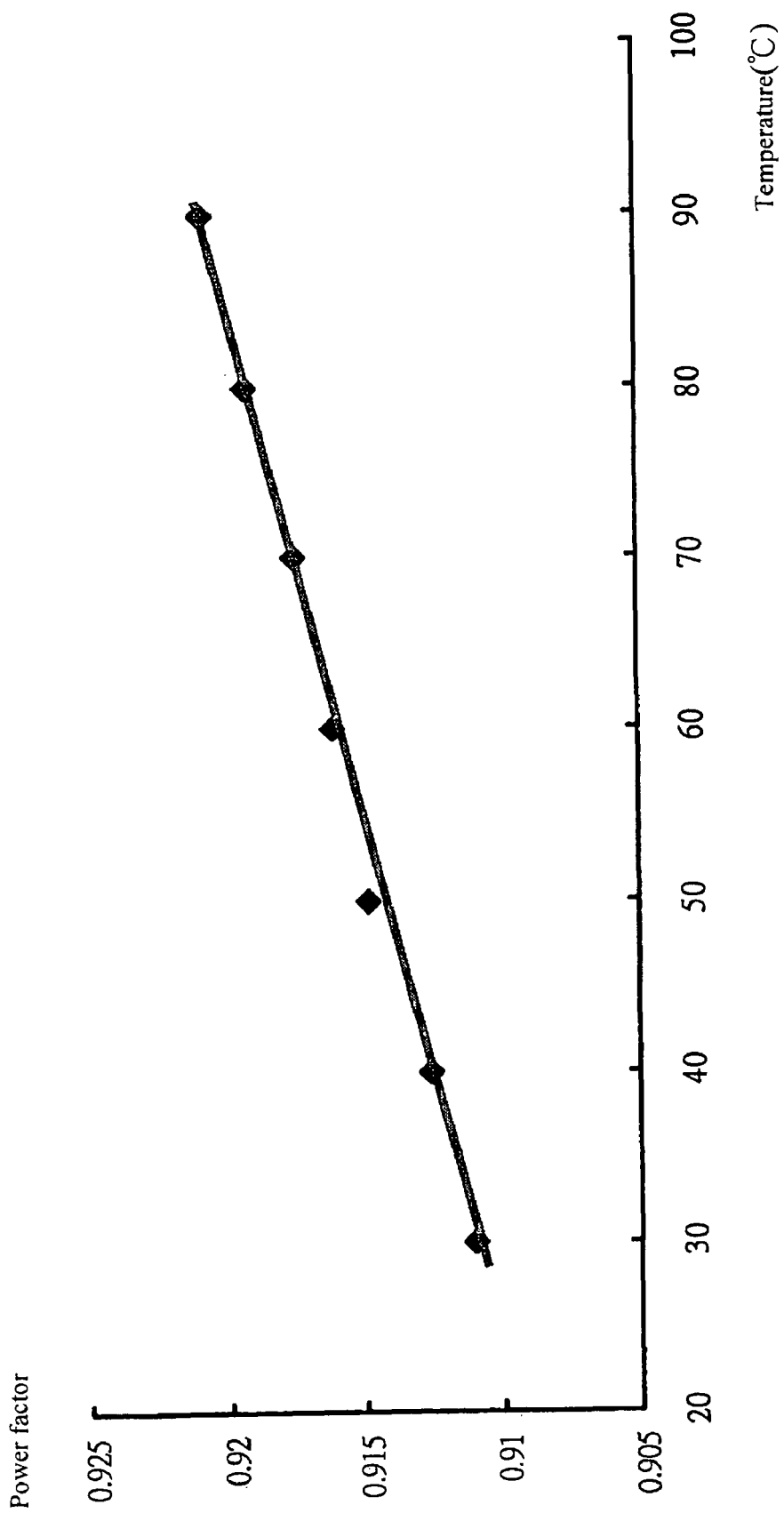
FIG. 10B shows a curve according to another preferred embodiment of the present invention.

FIG. 10B shows a curve plotted according to the measurement results in Table 5. At 90° C., the measured power factor PF90 is 0.92081; at 30° C., the measured power factor PF30 is 0.91102. It is thereby deduced K=$\Delta$PF/$\Delta$T=(0.92081−0.91102)/(90−30)=0.0001632. In the step S82, apply a rated AC voltage as the measurement voltage. At the initial temperature Ts, the initial power factor PF1 is measured. In the step S83, after thermal equilibrium, the thermal-equilibrium real power PFn is measured. In the step S84, calculate PFn−PF1 to give the power-factor variation $\Delta$PF. In the step S85, referring to the power factor-temperature function and the power-factor variation $\Delta$PF, the temperature change is calculated as $\Delta$T=$\Delta$PF/K=$\Delta$PF/0.0001632. Then, adding the calculated temperature change $\Delta$T to the initial temperature Ts gives the PN-junction temperature of the LED.

Figure 11A:
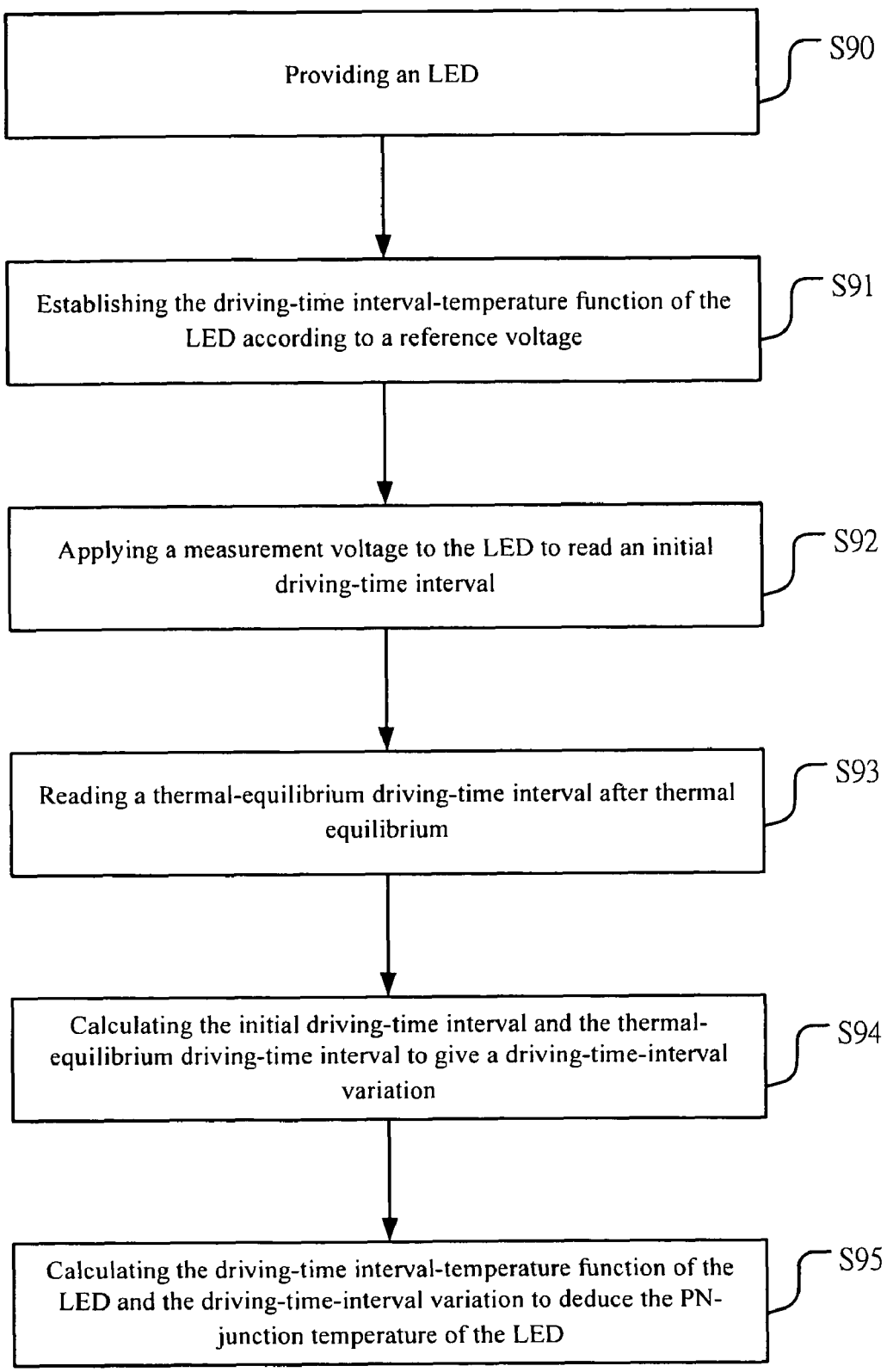
FIG. 11A shows a flowchart of a measuring method according to another preferred embodiment of the present invention.

FIG. 11A shows a flowchart of a measuring method according to another preferred embodiment of the present invention. As shown in FIG. 11A, the measuring method according to the present preferred embodiment comprises steps of:

S90: Providing an LED;
S91: Establishing the driving-time interval-temperature function of the LED according to a reference voltage;
S92: Applying a measurement voltage to the LED to measure an initial driving-time interval;
S93: Measuring a thermal-equilibrium driving-time interval after thermal equilibrium;
S94: Calculating the initial driving-time interval and the thermal-equilibrium driving-time interval to give a driving-time-interval variation; and
S95: Calculating the driving-time interval-temperature function of the LED and the driving-time-interval variation to deduce the PN-junction temperature of the LED.

Figure 11B:
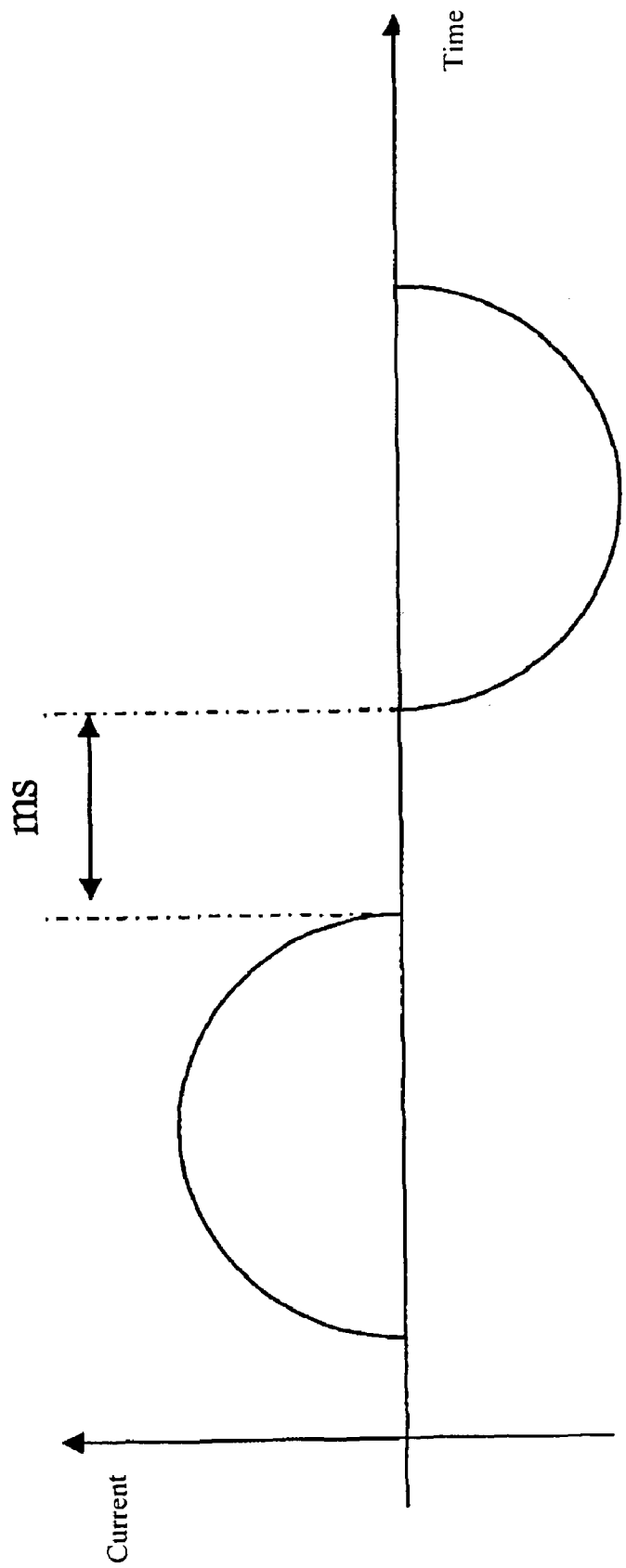
FIG. 11B shows a schematic diagram of driving-time interval according to the present invention.

The measuring method according to the present preferred embodiment uses the driving-time interval of an LED to deduce the PN-junction temperature of the LED. The driving-time interval is the driving-time interval between the positive and negative half-waves, which is also the time interval in AC current corresponding to the positive and negative voltage half-waves driven by the AC voltage on the LED. In addition, the thermal-equilibrium driving-time interval is different from the initial driving-time interval, as shown in FIGS. 4A and 11B.

In the step S91, apply a rated AC voltage as the reference voltage for establishing the driving-time interval-temperature function. The measurement results are listed in Table 6 as follows.

TABLE 6

| | Temperature (° C.) | | | | | | |
|---|---|---|---|---|---|---|---|
| | 30 | 40 | 50 | 60 | 70 | 80 | 90 |
| Measured Driving-time Interval (ms) | 2.952 | 2.832 | 2.754 | 2.696 | 2.64 | 2.568 | 2.512 |

Figure 11C:
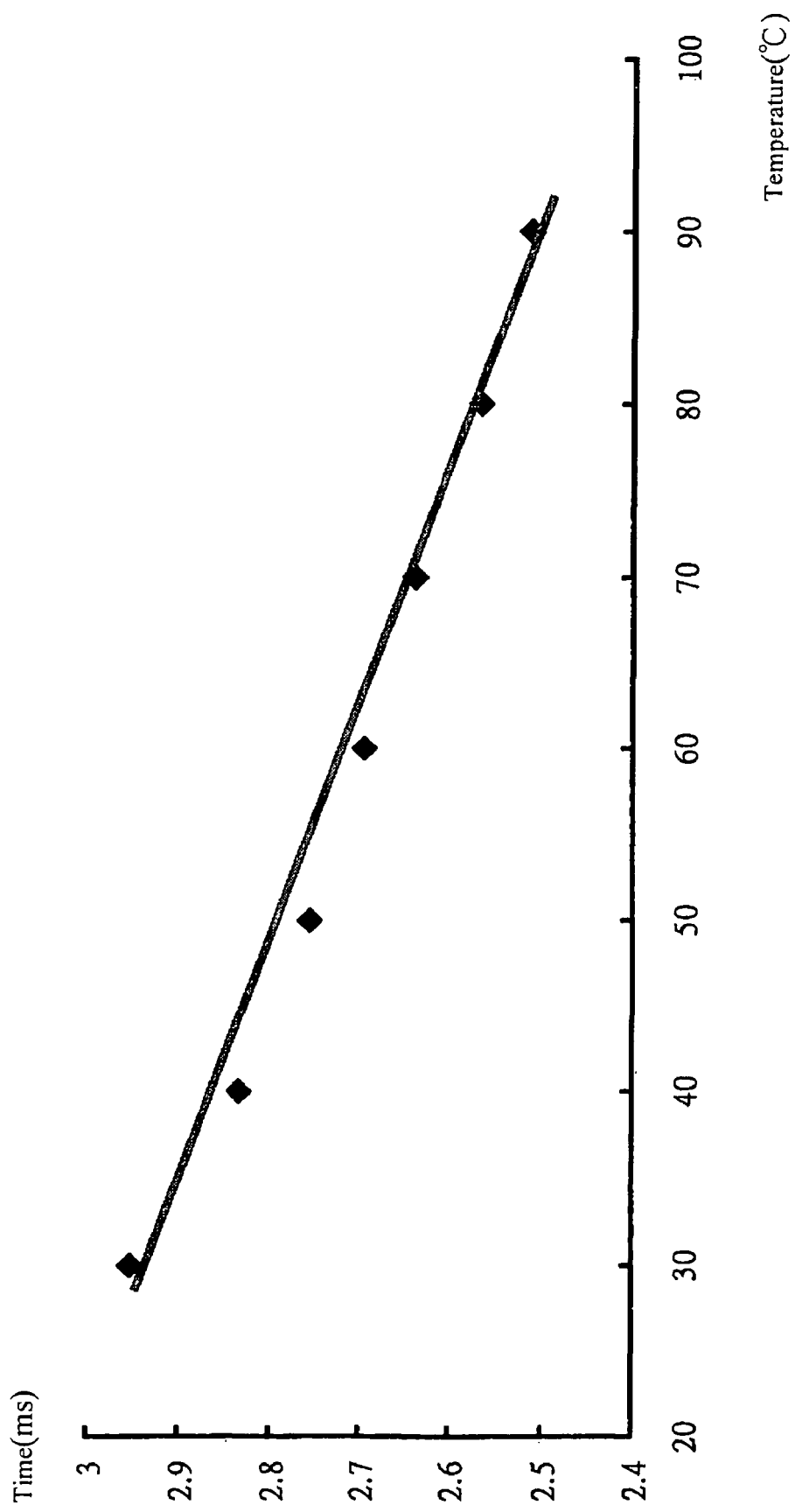
FIG. 11C shows a curve according to another preferred embodiment of the present invention.

FIG. 11C shows a curve plotted according to the measurement results in Table 6. At 90° C., the measured driving-time interval ms90 is 2.512 ms; at 30° C., the measured driving-time interval ms30 is 2.952 ms. It is thereby deduced K=$\Delta$ms/$\Delta$T=(2.512−2.952)/(90−30)=−0.0073. In the step S92, apply a rated AC voltage as the measurement voltage. At the initial temperature Ts, the initial driving-time interval ms1 is measured. In the step S93, after thermal equilibrium, the thermal-equilibrium driving-time interval msn is measured. In the step S94, calculate msn−ms1 to give the driving-time-interval variation $\Delta$ms. In the step S95, referring to the driving-time interval-temperature function and the driving-time-interval variation $\Delta$ms, the temperature change is calculated as $\Delta$T=$\Delta$ms/K=$\Delta$ms/−0.0073. Then, adding the calculated temperature change $\Delta$T to the initial temperature Ts gives the PN-junction temperature of the LED.

To sum up, the method for measuring the PN-junction temperature of an LED according to the present invention uses the function of current, real power, power factor, or driving-time interval on temperature and the corresponding initial values and thermal-equilibrium values thereof to deduce their variations. Thereby, the PN-junction temperature of the LED can be deduced, speeding up the process of temperature measurement of an LED.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A method for measuring the PN-junction temperature of a light-emitting diode (LED), comprising steps of:
   providing an LED;
   establishing the current-temperature function of the LED according to a reference voltage;
   applying a measurement voltage to the LED to measure an initial current;
   measuring a thermal-equilibrium current after thermal equilibrium;
   using the initial current and the thermal-equilibrium current to obtain a current variation; and
   using the current-temperature function of the LED and the current variation to deduce the PN-junction temperature of the LED.

2. The method for measuring of claim 1, wherein the step of applying a measurement voltage to the LED to measure an initial current includes connecting a load resistor in series with the LED, and deducing the initial current according to a resistance of the load resistor and an initial load voltage.

3. The method for measuring of claim 2, wherein the step of measuring a thermal-equilibrium current after thermal equilibrium includes deducing the thermal-equilibrium current according to the resistance of the load resistor and a thermal-equilibrium load voltage.

4. The method for measuring of claim 1, wherein the step of calculating the current-temperature function of the LED and the current variation to deduce the PN-junction temperature of the LED further includes deducing the PN-junction temperature of the LED according to an initial temperature.

5. The method for measuring of claim 1, wherein the LED is a direct-current (DC) LED or an alternating-current (AC) LED.

6. The method for measuring of claim 1, wherein the reference voltage is a direct-current (DC) voltage or an alternating-current (AC) voltage.

7. The method for measuring of claim 1, wherein the reference voltage is a minimum driving voltage of the LED.

8. The method for measuring of claim 1, wherein the measurement voltage is a direct-current (DC) voltage or an alternating-current (AC) voltage.

9. The method for measuring of claim 1, wherein the measurement voltage is a rated voltage.

* * * * *